(12) United States Patent
Zou et al.

(10) Patent No.: US 12,020,472 B2
(45) Date of Patent: Jun. 25, 2024

(54) IMAGE PROCESSING METHOD AND IMAGE PROCESSING APPARATUS

(71) Applicant: HUAWEI TECHNOLOGIES CO., LTD., Shenzhen (CN)

(72) Inventors: Xueyi Zou, Shenzhen (CN); Yiren Zhou, London (GB); Songcen Xu, Shenzhen (CN); Jianzhuang Liu, Shenzhen (CN); Youliang Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 92 days.

(21) Appl. No.: 17/388,386

(22) Filed: Jul. 29, 2021

(65) Prior Publication Data
US 2021/0358523 A1    Nov. 18, 2021

Related U.S. Application Data

(63) Continuation of application No. PCT/CN2019/114869, filed on Oct. 31, 2019.

(30) Foreign Application Priority Data

Jan. 30, 2019    (CN) .......................... 201910102854.3

(51) Int. Cl.
*G06V 10/771*    (2022.01)
*G06F 18/22*    (2023.01)
(Continued)

(52) U.S. Cl.
CPC ............ *G06V 10/771* (2022.01); *G06F 18/22* (2023.01); *G06T 7/248* (2017.01); *G06V 10/44* (2022.01);
(Continued)

(58) Field of Classification Search
CPC .... G11B 27/031; G06K 9/6215; G06T 7/248; G06T 2207/10016; G06T 2207/30242;
(Continued)

(56) References Cited

U.S. PATENT DOCUMENTS 7,460,689 B1    12/2008    Chan
9,008,366 B1    4/2015    Kim et al.
(Continued)

FOREIGN PATENT DOCUMENTS

CN        101394487 B  *  9/2011
CN        104243819 A     12/2014
(Continued)

OTHER PUBLICATIONS

English Translation of Chinese Publication CN108664879 (Year: 2018).*
English Translation of Korean Publication KR 101321974 (Year: 2013).*

*Primary Examiner* — Loi H Tran
(74) *Attorney, Agent, or Firm* — HUAWEI TECHNOLOGIES CO., LTD.

(57) ABSTRACT

An image processing method. The method includes: An electronic device obtains N images, where the N images have a same quantity of pixels and a same pixel location arrangement, and N is an integer greater than 1; the electronic device obtains, based on feature values of pixels located at a same location in the N images, a reference value of the corresponding location; the electronic device determines a target pixel of each location based on a reference value of the location; and the electronic device generates a target image based on the target pixel of each location.

17 Claims, 15 Drawing Sheets

(51) Int. Cl.
*G06T 7/246* (2017.01)
*G06V 10/44* (2022.01)
*G06V 10/74* (2022.01)
*G06V 10/75* (2022.01)
*G11B 27/031* (2006.01)

(52) U.S. Cl.
CPC .......... *G06V 10/759* (2022.01); *G06V 10/761* (2022.01); *G11B 27/031* (2013.01); *G06T 2207/10016* (2013.01); *G06T 2207/30242* (2013.01); *G06V 2201/07* (2022.01)

(58) Field of Classification Search
CPC ....... G06T 5/50; G06T 11/60; G06V 2201/07; G06V 10/771; G06V 10/44; G06V 10/759; G06V 10/761; G06F 18/22; H04N 23/60
USPC .......................................................... 386/278
See application file for complete search history.

(56) References Cited

U.S. PATENT DOCUMENTS

| | | |
|---|---|---|
| 2003/0179944 A1 | 9/2003 | Gindele et al. |
| 2008/0187234 A1* | 8/2008 | Watanabe ............... H04N 23/68 382/254 |
| 2017/0161591 A1* | 6/2017 | English ................. G06V 10/454 |
| 2017/0307869 A1* | 10/2017 | Zeng ..................... G02B 21/06 |
| 2018/0255212 A1* | 9/2018 | Sprigg ..................... H04N 5/33 |
| 2020/0184839 A1* | 6/2020 | Dorenkamp ............. G09B 5/12 |

FOREIGN PATENT DOCUMENTS

| | | | | |
|---|---|---|---|---|
| CN | 105491358 A | | 4/2016 | |
| CN | 108241645 A | | 7/2018 | |
| CN | 108664879 A | * | 10/2018 | ............. G06F 21/32 |
| CN | 108924439 A | | 11/2018 | |
| CN | 109903260 A | | 6/2019 | |
| KR | 101321974 B1 | * | 11/2013 | |

* cited by examiner

| First image | | |
|---|---|---|
| (Location 1) | Location 2 | Location 3 |
| Location 4 | Location 5 | Location 6 |
| Location 7 | Location 8 | Location 9 |

| Second image | | |
|---|---|---|
| Location 1 | Location 2 | (Location 3) |
| Location 4 | Location 5 | Location 6 |
| Location 7 | Location 8 | Location 9 |

| Third image | | |
|---|---|---|
| Location 1 | Location 2 | Location 3 |
| Location 4 | (Location 5) | Location 6 |
| Location 7 | Location 8 | Location 9 |

| Fourth image | | |
|---|---|---|
| Location 1 | Location 2 | Location 3 |
| Location 4 | Location 5 | (Location 6) |
| Location 7 | Location 8 | Location 9 |

| Location 1 | Location 2 | Location 3 |
|---|---|---|
| Location 4 | Location 5 | Location 6 |
| Location 7 | Location 8 | Location 9 |

Target image

IMAGE PROCESSING METHOD AND IMAGE PROCESSING APPARATUS

CROSS REFERENCE TO RELATED APPLICATIONS

This application is a continuation of International Application No. PCT/CN2019/114869, filed on Oct. 31, 2019, which claims priority to Chinese Patent Application No. 201910102854.3, filed on Jan. 30, 2019. The disclosures of the aforementioned applications are hereby incorporated by reference in their entireties.

TECHNICAL FIELD

The embodiments relate to the field of computer technologies, and in particular, to an image processing method and an image processing apparatus.

BACKGROUND

With rapid development of social applications and short video software, a growing quantity of users start to shoot videos, and share the videos in the social applications such as Moments or the short video software. Therefore, how to shoot a novel and interesting video or image to attract popularity has become one of demands of a user who shoots a video or an image by using a mobile phone.

Generally, a user continuously shoots, by using a mobile phone, a plurality of images that include a series of actions performed by a subject (for example, a person who does a somersault), and selects one of the images as a base image. Then, a region that is of the moving subject and that needs to be retained is selected from each of the shot images. For example, the user selects, by drawing the to-be-retained region by using a finger, the region that is of the moving subject and that needs to be retained. Finally, the moving subject is cut out based on the kept region outlined by the user, and the kept area outlined by the user is pasted to an appropriate location of the base image, to synthesize and present a still image having an effect of clones of the moving subject. However, in this method for selecting the kept region by the user and synthesizing the kept region with the base image, not only accuracy of the selected kept region is low, but also an effect of the synthesized image is poor.

SUMMARY

Embodiments provide an image processing method and an image processing apparatus, to efficiently and intelligently synthesize images, thereby generating high-quality images.

According to a first aspect, an embodiment provides an image processing method, including: obtaining N images, where the N images have a same quantity of pixels and a same pixel location arrangement, and N is an integer greater than 1; obtaining, based on feature values of pixels located at a same location in the N images, a reference value of the corresponding location; determining a target pixel of each location based on a reference value of the location; and generating a target image based on the target pixel of each location.

In this embodiment, the obtaining, based on feature values of pixels located at a same location in the N images, a reference value of the corresponding location may be understood as follows: For example, if the feature values of the pixels located at the same location in the N images are respectively $f(i, 1)$, $f(i, 2)$, $f(i, 3)$, ..., $f(i, N-1)$, and $f(i, N)$, the reference value $f(i)$ of the corresponding location may be obtained based on $f(i, 1)$, $f(i, 2)$, $f(i, 3)$, ..., $f(i, N-1)$, and $f(i, N)$, where $f(i, x)$ is a feature value of an $i^{th}$ location in an $x^{th}$ image in the N images, and $f(i)$ is the reference value of the location i. In another example, if feature values of pixels of a location j in the N images are respectively $f(j, 1)$, $f(j, 2)$, $f(j, 3)$, ..., $f(j, N-1)$, and $f(j, N)$, a reference value $f(j)$ of the location j may be obtained based on $f(j, 1)$, $f(j, 2)$, $f(j, 3)$, ..., $f(j, N-1)$, and $f(j, N)$. Therefore, a target pixel of the location i may be determined based on $f(i)$, and a target pixel of the location j may be determined based on $f(j)$, to generate a target image based on the target pixel of the location i and the target pixel of the location j. The pixel of the location i in the target image is obtained based on $f(i)$, and the pixel of the location j in the target image is obtained based on $f(j)$. It may be understood that, the location i and the location j are merely an example. The N images further include more same locations. Therefore, the location i and the location j shown in this embodiment should not be understood as a limitation on this embodiment of this application. It may be understood that, in that $f(i, x)$ is a feature value of an $i^{th}$ location in an $x^{th}$ image in the N images in this embodiment, the shown $i^{th}$ location is merely an example, and it should be not understood as that locations in each image are sorted.

In this embodiment, the reference value of the corresponding location is obtained based on the feature values of the pixels of the same location in the N images, to obtain the target pixel of each location based on the reference value of each location, thereby generating the target image based on the target pixel of each location. This avoids generating an image through a manual selection of a user, to automatically implement synthesis of an image.

With reference to the first aspect, in a possible implementation, the obtaining, based on feature values of pixels located at a same location in the N images, a reference value of the corresponding location includes: obtaining feature values of pixels located at a location i in the N images to obtain a set i of feature values, where the location i is any same location in the N images; and obtaining a reference value of the location i based on the set i of feature values.

In this embodiment, the obtaining feature values of pixels located at a location i in the N images to obtain a set i of feature values may be understood as obtaining the feature values of the pixels located at the same location i in the N images to obtain the set i of feature values. For example, the set i of feature values may be $f(i, 1)$, $f(i, 2)$, $f(i, 3)$, ..., $f(i, N-1)$, and $f(i, N)$, where $f(i, x)$ is a feature value of the $i^{th}$ location in the $x^{th}$ image in the N images. Therefore, the reference value $f(i)$ of the location i may be obtained based on $f(i, 1)$, $f(i, 2)$, $f(i, 3)$, ..., $f(i, N-1)$, and $f(i, N)$.

With reference to the first aspect or any possible implementation of the first aspect, the obtaining a reference value of the location i based on the set i of feature values includes: using an average value of the set i of feature values as the reference value of the location i.

In this embodiment, the reference value of the location i may be obtained by calculating the average value of the feature values included in the set i of feature values. For example, the reference value $f(i)$ of the location i may be obtained based on the average value of $f(i, 1)$, $f(i, 2)$, $f(i, 3)$, ..., $f(i, N-1)$, and $f(i, N)$.

With reference to the first aspect or any possible implementation of the first aspect, the obtaining a reference value of the location i based on the set i of feature values includes: using a median value of the set i of feature values as the reference value of the location i.

In this embodiment, the reference value of the location i may be obtained by calculating the median value of the feature values included in the set i of feature values. For example, the reference value f(i) of the location i may be obtained based on the median value of f(i, 1), f(i, 2), f(i, 3), . . . , f(i, N−1), and f(i, N). It may be understood that, the foregoing location i is merely an example. In an embodiment, the location i may be any same location in the N images.

With reference to the first aspect or any possible implementation of the first aspect, the obtaining a reference value of the location i based on the set i of feature values includes: using a mode of the set i of feature values as the reference value of the location i.

With reference to the first aspect or any possible implementation of the first aspect, the determining a target pixel of each location based on a reference value of the location includes: selecting, from pixels located at a location j in the N images, a pixel whose feature value has a smallest difference from a reference value of the location j as a target pixel of the location j, where the location j is any same location in the N images.

In this embodiment, for example, if the pixels of the location j in the N images are respectively y(j, 1), y(j, 2), y(j, 3), . . . , y(j, N−1), and y(j, N), a pixel whose feature value has a smallest difference from the reference value f(j) of the location j, for example, y(j, x1) may be selected therefrom, so that y(j, x1) is used as the target pixel of the location j. It may be understood that, the feature value of y(j, 1) is f(j, 1) in the foregoing embodiment, . . . , and a feature value of y(j, x1) is f(j, x1). In an embodiment, a feature value, for example, f(j, x1), which has a smallest difference from f(j) may be selected from the set of feature values f(j, 1), f(j, 2), . . . , and f(j, N), so that the pixel y(j, x1) corresponding to f(j, x1) is used as the target pixel of the location j.

The selecting, from pixels located at a location j in the N images, a pixel whose feature value has a smallest difference from a reference value of the location j as a target pixel of the location j may also be understood as selecting, from the pixels located at the location j in the N images, a pixel whose feature value is closest to the reference value of the location j as the target pixel of the location j.

With reference to the first aspect or any possible implementation of the first aspect, the determining a target pixel of each location based on a reference value of the location includes: selecting, from pixels located at a location j in the N images, a pixel whose feature value has a largest difference from a reference value of the location j as a target pixel of the location j, where the location j is any same location in the N images.

In this embodiment, for example, if the pixels of the location j in the N images are respectively y(j, 1), y(j, 2), y(j, 3), . . . , y(j, N−1), and y(j, N), a pixel whose feature value has a largest difference from the reference value f(j) of the location j, for example, y(j, x2) may be selected therefrom, so that y(j, x2) is used as the target pixel of the location j. It may be understood that, the feature value of y(j, 1) is f(j, 1) in the foregoing embodiment, . . . , and a feature value of y(j, x2) is f(j, x2). In an embodiment, a feature value, for example, f(j, x2), which has a largest difference from f(j) may be selected from the set of feature values f(j, 1), f(j, 2), . . . , and f(j, N), so that the pixel y(j, x2) corresponding to f(j, x2) is used as the target pixel of the location j.

The selecting, from pixels located at a location j in the N images, a pixel whose feature value has a largest difference from a reference value of the location j as a target pixel of the location j may also be understood as selecting, from the pixels located at the location j in the N images, a pixel whose feature value is farthest from the reference value of the location j as the target pixel of the location j.

It may be understood that, the foregoing location j is merely an example. In an embodiment, the location j may be any same location in the N images.

With reference to the first aspect or any possible implementation of the first aspect, a feature value of any pixel includes a feature value of a local feature of the pixel.

With reference to the first aspect or any possible implementation of the first aspect, a feature value of any pixel includes one or more of a grayscale value and a squared value.

With reference to the first aspect or any possible implementation of the first aspect, a feature value of any pixel includes a sum of a feature value of a local feature of the pixel and a grayscale value of the pixel; or a feature value of any pixel includes a sum of a feature value of a local feature of the pixel and a squared value of the pixel.

With reference to the first aspect or any possible implementation of the first aspect, the obtaining N images includes: obtaining N video frames in a raw video as the N images.

With reference to the first aspect or any possible implementation of the first aspect, each of the N images includes a target object, and after the generating a target image based on the target pixel of each location, the method further includes: synthesizing a target video based on the target image and the N images, where the target video is a video in which the target objects constantly increase with a play order of the target video.

With reference to the first aspect or any possible implementation of the first aspect, each of the N images includes a target object, and after the generating a target image based on the target pixel of each location, the method further includes: synthesizing a target video based on the target image and the N images, where the target video is a video in which the target objects constantly decrease with a play order of the target video.

With reference to the first aspect or any possible implementation of the first aspect, each of the N images includes a target object, locations of the target image in the N images are different, and the target image includes N target objects.

According to a second aspect, an embodiment provides an image processing apparatus, including: an obtaining unit, configured to obtain N images, where the N images have a same quantity of pixels and a same pixel location arrangement, and N is an integer greater than 1; a first processing unit, configured to obtain, based on feature values of pixels located at a same location in the N images, a reference value of the corresponding location;

a second processing unit, configured to determine a target pixel of each location based on a reference value of the location; and an image generation unit, configured to generate a target image based on the target pixel of each location.

With reference to the second aspect, in a possible implementation, the first processing unit is configured to: obtain feature values of pixels located at a location i in the N images to obtain a set i of feature values, where the location i is any same location in the N images; and obtain a reference value of the location i based on the set i of feature values.

With reference to the second aspect or any possible implementation of the second aspect, the second processing unit is configured to select, from pixels located at a location j in the N images, a pixel whose feature value has a smallest difference from a reference value of the location j as a target pixel of the location j, where the location j is any same location in the N images.

With reference to the second aspect or any possible implementation of the second aspect, the second processing unit is configured to select, from pixels located at a location j in the N images, a pixel whose feature value has a largest difference from a reference value of the location j as a target pixel of the location j, where the location j is any same location in the N images.

With reference to the second aspect or any possible implementation of the second aspect, the first processing unit obtains the reference value of the location i based on the set i of feature values, and is configured to use an average value of the set i of feature values as the reference value of the location i.

With reference to the second aspect or any possible implementation of the second aspect, the first processing unit obtains the reference value of the location i based on the set i of feature values, and is configured to use a median value of the set i of feature values as the reference value of the location i.

With reference to the second aspect or any possible implementation of the second aspect, the first processing unit obtains the reference value of the location i based on the set i of feature values, and is configured to use a mode of the set i of feature values as the reference value of the location i.

With reference to the second aspect or any possible implementation of the second aspect, a feature value of any pixel includes a feature value of a local feature of the pixel.

With reference to the second aspect or any possible implementation of the second aspect, a feature value of any pixel includes one or more of a grayscale value and a squared value.

With reference to the second aspect or any possible implementation of the second aspect, a feature value of any pixel includes a sum of a feature value of a local feature of the pixel and a grayscale value of the pixel; or a feature value of any pixel includes a sum of a feature value of a local feature of the pixel and a squared value of the pixel.

With reference to the second aspect or any possible implementation of the second aspect, the obtaining unit is configured to obtain N video frames in a raw video as the N images.

With reference to the second aspect or any possible implementation of the second aspect, each of the N images includes a target object, and the image processing apparatus further includes: a video synthesizing unit, configured to synthesize a target video based on the target image and the N images, where the target video is a video in which the target objects constantly increase with a play order of the target video.

With reference to the second aspect or any possible implementation of the second aspect, each of the N images includes a target object, and the image processing apparatus further includes: a video synthesizing unit, configured to synthesize a target video based on the target image and the N images, where the target video is a video in which the target objects constantly decrease with a play order of the target video.

With reference to the second aspect or any possible implementation of the second aspect, each of the N images includes a target object, locations of the target object in the N images are different, and the target image includes N target objects.

According to a third aspect, an embodiment provides an electronic device, including a processor and a memory. The memory is configured to store computer program code. The computer program code includes computer instructions. The memory is coupled to the processor. When the processor executes the computer instructions, the processor is configured to: obtain N images, where the N images have a same quantity of pixels and a same pixel location arrangement, and N is an integer greater than 1; obtain, based on feature values of pixels located at a same location in the N images, a reference value of the corresponding location; determine a target pixel of each location based on a reference value of the location; and generate a target image based on the target pixel of each location.

With reference to the third aspect or any possible implementation of the third aspect, the electronic device further includes: a display, where the display is coupled to the processor, and the display is configured to display one or more of the N images and the target image.

With reference to the third aspect, in a possible implementation, the processor is configured to: obtain feature values of pixels located at a location i in the N images to obtain a set i of feature values, where the location i is any same location in the N images; and obtain a reference value of the location i based on the set i of feature values.

With reference to the third aspect or any possible implementation of the third aspect, the processor is configured to select, from pixels located at a location j in the N images, a pixel whose feature value has a smallest difference from a reference value of the location j as a target pixel of the location j, where the location j is any same location in the N images.

With reference to the third aspect or any possible implementation of the third aspect, the processor is configured to select, from pixels located at a location j in the N images, a pixel whose feature value has a largest difference from a reference value of the location j as a target pixel of the location j, where the location j is any same location in the N images.

With reference to the third aspect or any possible implementation of the third aspect, the processor is configured to use an average value of the set i of feature values as the reference value of the location i.

With reference to the third aspect or any possible implementation of the third aspect, the processor is configured to use a median value of the set i of feature values as the reference value of the location i.

With reference to the third aspect or any possible implementation of the third aspect, the processor is configured to use a mode of the set i of feature values as the reference value of the location i.

With reference to the third aspect or any possible implementation of the third aspect, a feature value of any pixel includes a feature value of a local feature of the pixel.

With reference to the third aspect or any possible implementation of the third aspect, a feature value of any pixel includes one or more of a grayscale value and a squared value.

With reference to the third aspect or any possible implementation of the third aspect, a feature value of any pixel includes a sum of a feature value of a local feature of the pixel and a grayscale value of the pixel; or a feature value of any pixel includes a sum of a feature value of a local feature of the pixel and a squared value of the pixel.

With reference to the third aspect or any possible implementation of the third aspect, the processor is configured to obtain N video frames in a raw video as the N images.

With reference to the third aspect or any possible implementation of the third aspect, the electronic device further includes a camera, where the camera is coupled to the processor, and the camera is configured to obtain the raw video.

With reference to the third aspect or any possible implementation of the third aspect, each of the N images includes a target object, and the processor is further configured to synthesize a target video based on the target image and the N images, where the target video is a video in which the target objects constantly increase with a play order of the target video.

With reference to the third aspect or any possible implementation of the third aspect, each of the N images includes a target object, and the processor is further configured to synthesize a target video based on the target image and the N images, where the target video is a video in which the target objects constantly decrease with a play order of the target video.

With reference to the third aspect or any possible implementation of the third aspect, each of the N images includes a target object, locations of the target object in the N images are different, and the target image includes N target objects.

According to a fourth aspect, an embodiment provides a computer storage medium. The computer storage medium includes computer instructions. When the computer instructions are executed on an electronic device, the electronic device is enabled to perform the image processing method according to the first aspect or any possible implementation of the first aspect.

According to a fifth aspect, an embodiment provides a computer program product. When run on a computer, the computer program product enables the computer to perform the image processing method according to the first aspect or any possible implementation of the first aspect.

BRIEF DESCRIPTION OF DRAWINGS

FIG. 7 is a schematic diagram of still another location matching according to an embodiment;

FIG. 8 is a schematic diagram of still another location matching according to an embodiment;

DETAILED DESCRIPTION OF THE EMBODIMENTS

The following describes the embodiments with reference to the accompanying drawings in the embodiments.

In the specification, claims, and accompanying drawings, the terms "first", "second", and so on are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, "at least one" means one or more, "a plurality of" means two or more, "at least two" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items" or a similar expression thereof means any combination of these items, including any combination of a single item or a plurality of items. For example, at least one of a, b, and c may represent a, b, c, "a and b", "a and c", "b and c", or "a, b, and c", where a, b, and c may be singular or plural.

Figure 1:
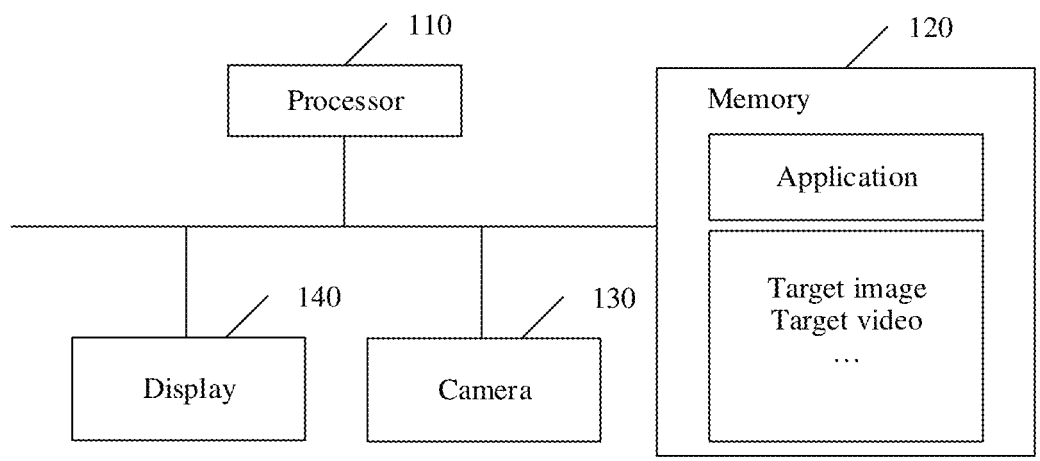
FIG. 1 is a schematic structural diagram of an electronic device according to an embodiment.

FIG. 1 is a schematic structural diagram of an electronic device according to an embodiment. As shown in FIG. 1, the electronic device may include a processor 110, a memory 120, a camera 130, and a display 140. The processor 110, the memory 120, the camera 130, and the display 140 are coupled by using a connector. The connector includes various interfaces, transmission lines, buses, or the like. This is not limited in this embodiment. It should be understood that, in the embodiments, coupling refers to a mutual connection in a specific manner, including a direct connection or an indirect connection by using another device, for example, a connection by using various interfaces, transmission lines, buses, or the like.

The processor 110 may be one or more central processing units (CPU). When the processor 110 is one CPU, the CPU may be a single-core CPU, or may be a multi-core CPU. Optionally, the processor 110 may be a processor group including a plurality of processors, and the plurality of processors are coupled to each other by using one or more buses. Optionally, the processor may alternatively be a processor of another type, or the like. This is not limited in this embodiment.

The memory 120 may be configured to store computer program instructions, and includes an operation system (OS) and various types of computer program code including program code used for executing the solutions of an embodiment. Optionally, the memory 120 includes but is not limited to a non-power-failure volatile memory, such as an embedded multimedia card (EMMC), a universal flash storage (UFS) or a read-only memory (ROM), or another type of static storage device that may store static information and instructions, or may be a power failure volatile memory, for example, a random access memory (RAM), or another type of dynamic storage device that may store information and instructions, or may be an electrically erasable programmable read-only memory (EEPROM), a compact disc read-only memory (CD-ROM), or other optical disk storage, optical disc storage (including a compact disc, a laser disc, an optical disc, a digital versatile disc, a Blu-ray disc, and the like), a disk storage medium or another magnetic storage device, or any other computer-readable storage medium that can be used for carrying or storing program code in a form of an instruction or a data structure and that can be accessed by a computer, or the like. The memory 120 is configured to store related instructions and data.

It may be understood that, in this embodiment, the memory may be configured to store not only related instructions, but also a related image and video. For example, the memory may be configured to store a raw video obtained by using the camera 130, or the memory may be further configured to store a target image and a target video that are generated by using the processor 110, and the like. A video or an image stored in the memory is not limited in this embodiment.

The camera 130 may be configured to obtain a related video or image, or the like. The display 140 may be configured to display the related video or image. For example, the display 140 may be configured to display the target image, the target video, and the like. This is not limited in this embodiment.

Figure 2:
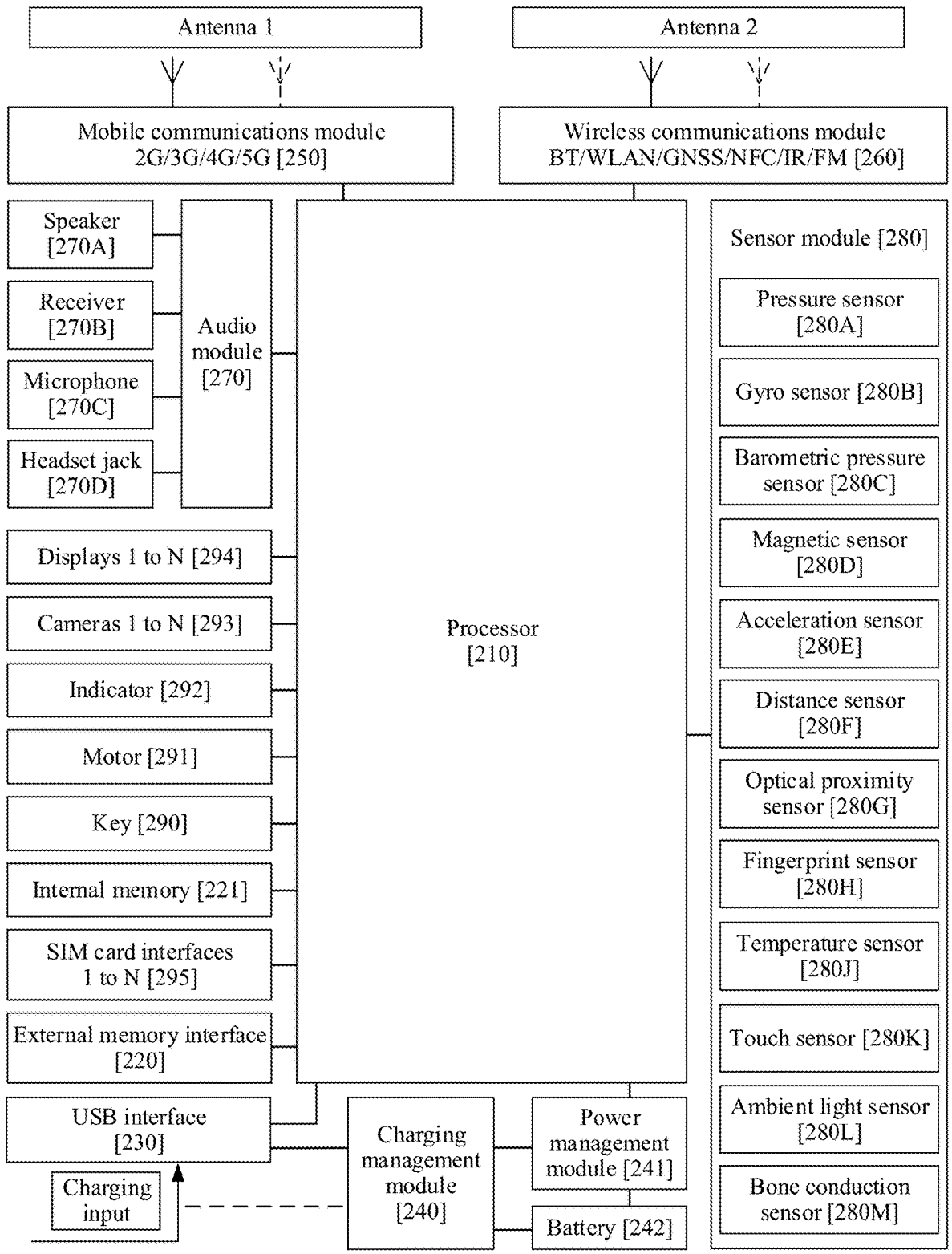
FIG. 2 is a schematic structural diagram of another electronic device according to an embodiment.

Further, FIG. 2 is a schematic structural diagram of another electronic device according to an embodiment. As shown in FIG. 2, the electronic device may include a processor 210, an external memory interface 220, an internal memory 221, a universal serial bus (USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a key 290, a motor 291, an indicator 292, a camera 293, a display 294, a subscriber identification module (SIM) card interface 295, and the like. The sensor module 280 may include a pressure sensor 280A, a gyro sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, or the like.

It may be understood that a structure shown in this embodiment does not constitute a specific limitation on the electronic device. In some other embodiments, the electronic device may include more or fewer components than those shown in the figure, or combine some components, or split some components, or have different component arrangements. The components shown in the figure may be implemented by using hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, a neural-network unit (NPU), and/or the like. Different processing units may be independent devices, or may be integrated into one or more processors.

The controller may be a nerve center and a command center of the electronic device. The controller may generate an operation control signal based on an instruction operation code and a timing signal, to control instruction fetching and instruction execution.

A memory may be further disposed in the processor 210, and is configured to store instructions and data. In some embodiments, the memory in the processor 210 is a cache. The memory may store instructions or data that has just been used or recycled by the processor 210.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that, an interface connection relationship between the modules shown in this embodiment is merely an example for description, and does not constitute a structural limitation on the electronic device. In some other embodiments, the electronic device may alternatively use an interface connection manner different from that in the foregoing embodiment, or a combination of a plurality of interface connection manners.

The charging management module 240 is configured to receive a charging input from a charger. When charging the battery 242, the charging management module 240 may further supply power to the electronic device by using the power management module 241.

The power management module 241 is configured to connect to the battery 242, the charging management module 240, and the processor 210. The power management module 241 receives an input from the battery 242 and/or the charging management module 240, and supplies power to the processor 210, the internal memory 221, an external memory, the display 294, the camera 293, the wireless communications module 260, and the like. The power management module 241 may be further configured to monitor parameters such as a battery capacity, a quantity of battery cycles, and a battery health status (electric leakage and impedance). In some other embodiments, the power management module 241 may alternatively be disposed in the processor 210. In some other embodiments, the power management module 241 and the charging management module 240 may alternatively be disposed in a same device.

A wireless communication function of the electronic device may be implemented by using the antenna 1, the antenna 2, the mobile communications module 250, the wireless communications module 260, the modem processor, the baseband processor, and the like.

The antenna 1 and the antenna 2 are configured to transmit and receive electromagnetic wave signals. For example, in this embodiment, the antenna 1 and the antenna 2 may be configured to send data to a cloud server, to back up an image or a video stored in the memory of the electronic device (including one or more of a target image, a raw video, and a target video), and the like to the cloud. The antenna 1 and the antenna 2 may be further configured to send a download request to the cloud server, where the download request is used for obtaining an image backed up in the cloud. The antenna 1 and the antenna 2 may be further configured to receive data sent by the cloud server in response to the download request sent by the electronic device. In another example, in this embodiment, the antenna 1 and the antenna 2 may be further configured to send data to another electronic device, to send the obtained target image and the obtained target video to the another electronic device, or the like.

The mobile communications module 250 may provide a solution applied to the electronic device for wireless communication such as 2G/3G/4G/5G. The mobile communications module 250 may include at least one filter, a switch, a power amplifier, a low noise amplifier (LNA), and the like. The mobile communications module 250 may receive an electromagnetic wave by using the antenna 1, perform processing such as filtering and amplification on the received electromagnetic wave, and transmit the electromagnetic wave to the modem processor for demodulation. The mobile communications module 250 may further amplify a signal modulated by the modem processor, and convert the signal into an electromagnetic wave by using the antenna 1 for radiation. In some embodiments, at least some function modules of the mobile communications module 250 may be disposed in the processor 210. In some embodiments, at least some function modules of the mobile communications module 250 and at least some modules of the processor 210 may be disposed in a same device.

The modem processor may include a modulator and a demodulator. In some embodiments, the modem processor may be an independent device. In some other embodiments, the modem processor may be independent of the processor 210, and disposed in a same device as the mobile communications module 250 or another function module.

The wireless communications module 260 may provide a solution applied to the electronic device for wireless communication including wireless local area network (WLAN) (for example, wireless fidelity (Wi-Fi) network), Bluetooth (BT), global navigation satellite system (GNSS), frequency modulation (FM), near field communication (NFC), and infrared (IR) technologies. The wireless communications module 260 may be one or more devices integrating at least one communication processing module. The wireless communications module 260 receives an electromagnetic wave by using the antenna 2, performs frequency modulation and filtering on the electromagnetic wave signal, and sends the processed signal to the processor 210. The wireless communications module 260 may further receive a to-be-sent signal from the processor 210, perform frequency modulation and amplification on the to-be-sent signal, and convert the signal into an electromagnetic wave by using the antenna 2 for radiation.

In some embodiments, in the electronic device, the antenna 1 is coupled to the mobile communications module 250, and the antenna 2 is coupled to the wireless communications module 260, so that the electronic device can communicate with a network and another device by using a wireless communications technology. The wireless communications technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, and/or IR technologies. The GNSS may include a global positioning system (GPS), a global navigation satellite system (GLONASS), a BeiDou navigation satellite system (BDS), a quasi-zenith satellite system (QZSS) and/or a satellite based augmentation system (SBAS).

The electronic device implements a display function by using the GPU, the display 294, the application processor, and the like. The GPU is a microprocessor for image processing, and is connected to the display 294 and the application processor. The processor 210 may include one or more GPUs that execute program instructions to generate or change display information.

The display 294 is configured to display an image, a video, and the like. The display 294 includes a display panel. The display panel may use a liquid crystal display (LCD), an organic light-emitting diode (OLED), an active-matrix organic light emitting diode (AMOLED), a flex light-emitting diode (FLED), a mini-LED, a micro-LED, a micro-OLED, a quantum dot light emitting diode (QLED), or the like. In some embodiments, the electronic device may include one or more displays 294. For example, in this embodiment, the display 294 may be configured to display a related image or video, for example, display a target image and a target video.

The electronic device may implement a shooting function by using the ISP, the camera 293, the video codec, the GPU, the display 294, the application processor, and the like.

The ISP is configured to process data fed back by the camera 293. For example, when photographing is performed, a shutter is opened, light is transferred to a camera photosensitive element by using a lens, an optical signal is converted into an electrical signal, and the camera photosensitive element transfers the electrical signal to the ISP for processing, and the electrical signal is converted into an image visible to naked eyes. The ISP may also optimize noise, luminance, and a skin color of an image. The ISP may also optimize parameters such as exposure and a color temperature of a shooting scene. In some embodiments, the ISP may be disposed in the camera 293.

The camera 293 is configured to capture a still image or a video. An optical image of an object is generated by using the lens, and is projected onto the photosensitive element. The photosensitive element may be a charge coupled device (CCD) or a complementary metal-oxide-semiconductor (CMOS) phototransistor. The photosensitive element converts the optical signal into an electrical signal, and then transfers the electrical signal to the ISP for conversion into a digital image signal. The ISP outputs the digital image signal to the DSP for processing. The DSP converts the digital image signal into an image signal in a standard format such as RGB or YUV. In some embodiments, the electronic device may include one or more cameras 293.

The digital signal processor is configured to process a digital signal, and may process another digital signal in addition to a digital image signal. For example, when the electronic device selects a frequencypoint, the digital signal processor is configured to perform Fourier Transform on energy of the frequencypoint.

The video codec is configured to compress or decompress a digital video. The electronic device may support one or more video codecs. In this way, the electronic device may play or record videos in a plurality of encoding formats, for example, moving picture experts group (moving picture experts group, MPEG) 1, MPEG2, MPEG3, and MPEG4.

The NPU is a neural-network (NN) computing processor. By drawing on a structure of a biological neural network, for example, by drawing on a transmission mode between human brain neurons, the NPU quickly processes input information, and may further continuously perform self-learning. An application such as intelligent cognition, for example, image recognition, facial recognition, speech recognition, or text understanding of the electronic device may be implemented by using the NPU.

The external memory interface 220 may be configured to connect to an external memory card, for example, a micro SD card, to implement a storage capability of the electronic device. The external memory card communicates with the processor 210 by using the external memory interface 220, to implement a data storage function. For example, in this embodiment, an image or a video may be stored in the external memory card, and the processor 210 of the electronic device may obtain, by using the external memory interface 220, the image stored in the external memory card.

The internal memory 221 may be configured to store computer-executable program code, where the executable program code includes instructions. The processor 210 executes various function applications of the electronic device and data processing by running the instructions stored in the internal memory 221. The internal memory 221 may include a program storage area and a data storage area. The program storage area may store an operating system, an application required by at least one function (for example, a sound playing function or an image playing function), and the like. The data storage area may store data (for example, audio data, a phone book, and an image), and the like created in a process of using the electronic device. In addition, the internal memory 221 may include a high-speed random access memory, and may further include a non-volatile memory, for example, at least one disk storage device, a flash memory device, and a universal flash memory (universal flash storage, UFS). For example, in this embodiment, the internal memory 221 may be configured to store a plurality of frames of images or a video, and the plurality of frames of images or the video may be obtained by the electronic device through shooting by using the camera 293, or may be obtained by the electronic device after the electronic device receives the plurality of frames of images and the video from another application (for example, WeChat, a microblog, or a facebook) by using the antenna 1 and the antenna 2 and downloads the plurality of frames of images and the video by using the antenna 1 and the antenna 2.

The electronic device may implement an audio function such as music play or recording by using the audio module 270, the speaker 270A, the receiver 270B, the microphone 270C, the headset jack 270D, the application processor, and the like.

The pressure sensor 280A is configured to sense a pressure signal, and may convert the pressure signal into an electrical signal. In some embodiments, the pressure sensor 280A may be disposed on the display 294.

The gyro sensor 280B may be configured to determine a motion posture of the electronic device. The gyro sensor 280B may also be used for scenarios of navigation and motion sensing games. The barometric pressure sensor 280C is configured to measure barometric pressure. The magnetic sensor 280D includes a Hall effect sensor. The acceleration sensor 280E may detect magnitudes of accelerations of the electronic device in various directions (generally three axes). The distance sensor 280F is configured to measure a distance. The optical proximity sensor 280G may include, for example, a light emitting diode (LED) and an optical detector, such as a photodiode. The electronic device may detect, by using the optical proximity sensor 280G, that a user holds the electronic device close to the ear for a call, to automatically turn off the screen to save power. The optical proximity sensor 280G may also be used for automatic screen unlocking and locking in a carrying case mode or a pocket mode. The ambient light sensor 280L is configured to sense ambient luminance. The ambient light sensor 280L may also be configured to automatically adjust white balance during photographing.

The fingerprint sensor 280H is configured to acquire a fingerprint. The electronic device may implement, by using a characteristic of an acquired fingerprint, fingerprint unlocking, accessing an application lock, fingerprint photographing, answering an incoming call by using a fingerprint, and the like.

The temperature sensor 280J is configured to detect a temperature.

The touch sensor 280K is also referred to as a "touch panel". The touch sensor 280K may be disposed on the display 294. A touchscreen includes the touch sensor 280K and the display 294, and is also referred to as a "touch screen". The touch sensor 280K is configured to detect a touch operation acting on or near the touch sensor 280K. The touch sensor may transfer the detected touch operation to the application processor, to determine a touch event type. A visual output related to the touch operation may be provided by using the display 294. In some other embodiments, the touch sensor 280K may alternatively be disposed on a surface of the electronic device, and at a location different from that of the display 294.

The bone conduction sensor 280M may obtain a vibration signal. The bone conduction sensor 280M may also contact a pulse of a human body and receive a blood pressure pulse signal.

The key 290 includes a power key, a volume key, or the like. The key 290 may be a mechanical key, or may be a touch key. The electronic device may receive a key input, and generate a key signal input related to user settings and function control of the electronic device.

The motor 291 may generate a vibration prompt. The motor 291 may be used for an incoming call vibration prompt, or may be used for touch vibration feedback.

The indicator 292 may be an indicator light, and may be configured to indicate a charging status and a battery level change, or may be configured to indicate a message, a missed call, a notification, and the like.

The SIM card interface 295 is configured to connect to a SIM card. The SIM card may be inserted into the SIM card interface 295 or pulled out of the SIM card interface 295, to implement contact with and separation from the electronic device. The electronic device may support one or more SIM card interfaces. The electronic device interacts with a network by using the SIM card, to implement functions such as a call and data communication.

A software system of the electronic device may use a layered architecture, an event-driven architecture, a microkernel architecture, a microservice architecture, or a cloud architecture. In the embodiments, a software structure of the electronic device is described by using an Android system with a layered architecture as an example.

Figure 3:
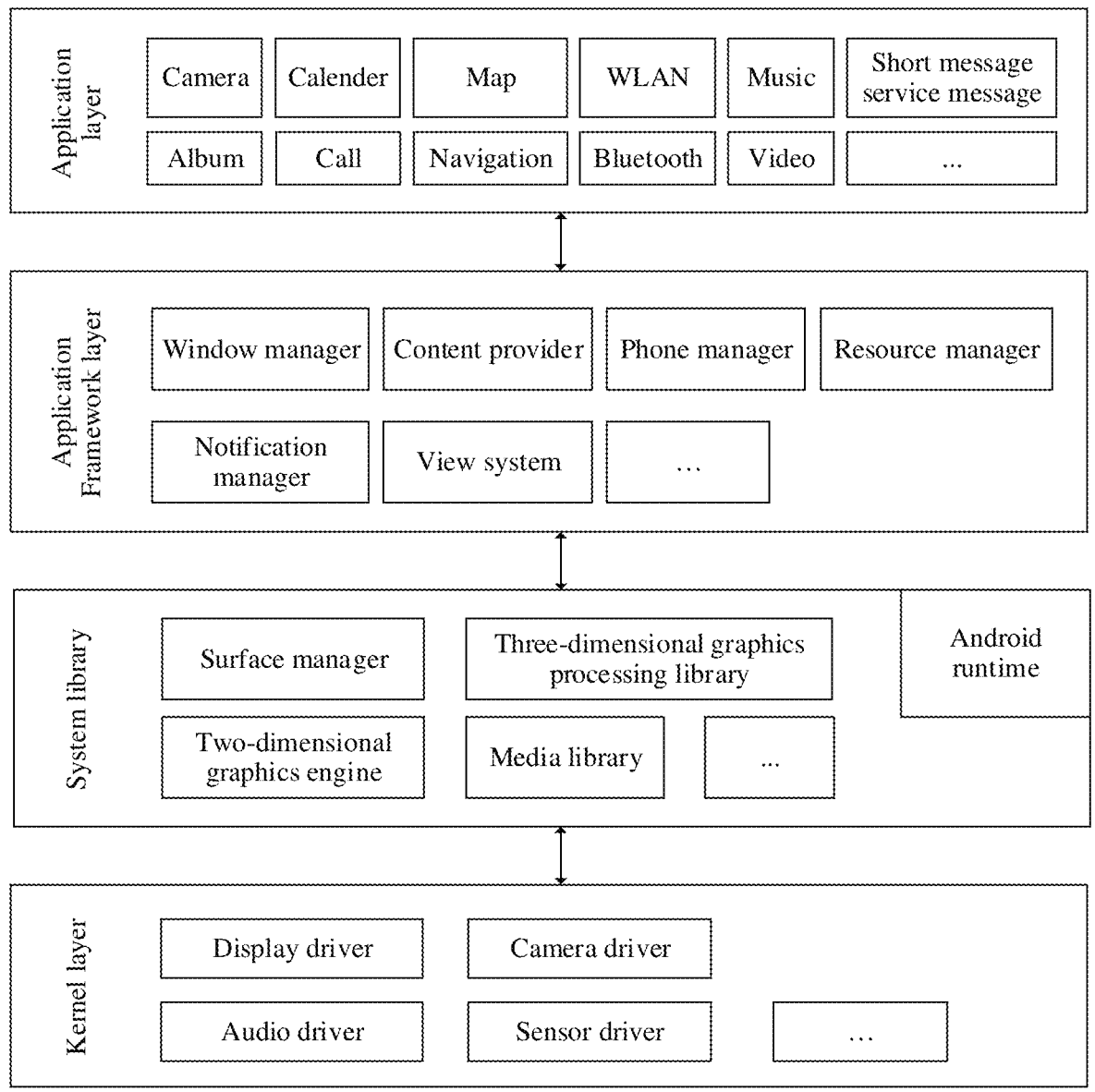
FIG. 3 is a block diagram of a software structure of an electronic device according to an embodiment.

FIG. 3 is a block diagram of a software structure of an electronic device according to an embodiment.

A layered architecture divides software into several layers, which communicate with each other by using software interfaces. In some embodiments, an Android system is divided into four layers, which are an application layer, an application framework layer, an Android runtime (Android runtime) and a system library, and a kernel layer from top to bottom.

The application layer may include a series of application packages.

As shown in FIG. 3, the application package may include applications such as a short message service message, a facebook, a QQ, a map, an album, a calendar, a WLAN, a twitter (twitter), a music player, and an Amazon.

The application framework layer provides an application programming interface (application programming interface, API) and a programming framework for an application of the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, lock the screen, capture the screen, and the like.

The content provider is configured to: store and obtain data and make the data accessible to an application. The data may include a video, an image, audio, calls made and answered, a browse history and a bookmark, a personal address book, and the like.

The view system includes a visual control, for example, a control for displaying text or a control for displaying an image. The view system can be configured to build an application. The display interface may include one or more views.

The phone manager is configured to provide a communication function of the electronic device, for example, call status management (including call connection and disconnection, and the like).

The resource manager provides various resources for an application, such as a localized string, an icon, an image, a layout file, and a video file.

The notification manager enables an application to display, in the status bar, notification information, which can be used for conveying a notification-type message that can automatically disappear after a short stay without user interaction.

The Android runtime includes a core library and a virtual machine. The Android runtime is responsible for scheduling and managing the Android system.

The core library includes two parts: one is a performance function that a Java language needs to invoke, and the other is a core library of Android.

The application layer and the application framework layer run in the virtual machine. The virtual machine executes Java files of the application layer and application framework layer as binary files. The virtual machine is configured to execute functions such as object life cycle management, stack management, thread management, security and exception management, and garbage collection.

The system library may include a plurality of function modules, for example, a surface manager, a media library, a three-dimensional graphics processing library (for example, an OpenGL ES), and a 2D graphics engine (for example, an SGL).

The surface manager is configured to manage a display subsystem, and provides a fusion of 2D and 3D layers for a plurality of applications.

The media library supports playback and recording of a plurality of common audio and video formats, a still image file, and the like. The media library may support a plurality of audio and video encoding formats, such as MPEG4, H.264, MP3, AAC, AMR, JPG, and PNG.

The three-dimensional graphics processing library is configured to implement three-dimensional graphics drawing, image rendering and synthesis, layer processing, and the like.

The 2D graphics engine is a drawing engine for 2D drawing.

The kernel layer is a layer between hardware and software. The kernel layer includes at least a display driver, a camera driver, an audio driver, and a sensor driver.

For example, all solutions in the following embodiments may be implemented in an electronic device having the foregoing hardware architecture and software architecture. The following describes in detail an image processing method provided in the embodiments with reference to the accompanying drawings and application scenarios.

Figure 4:
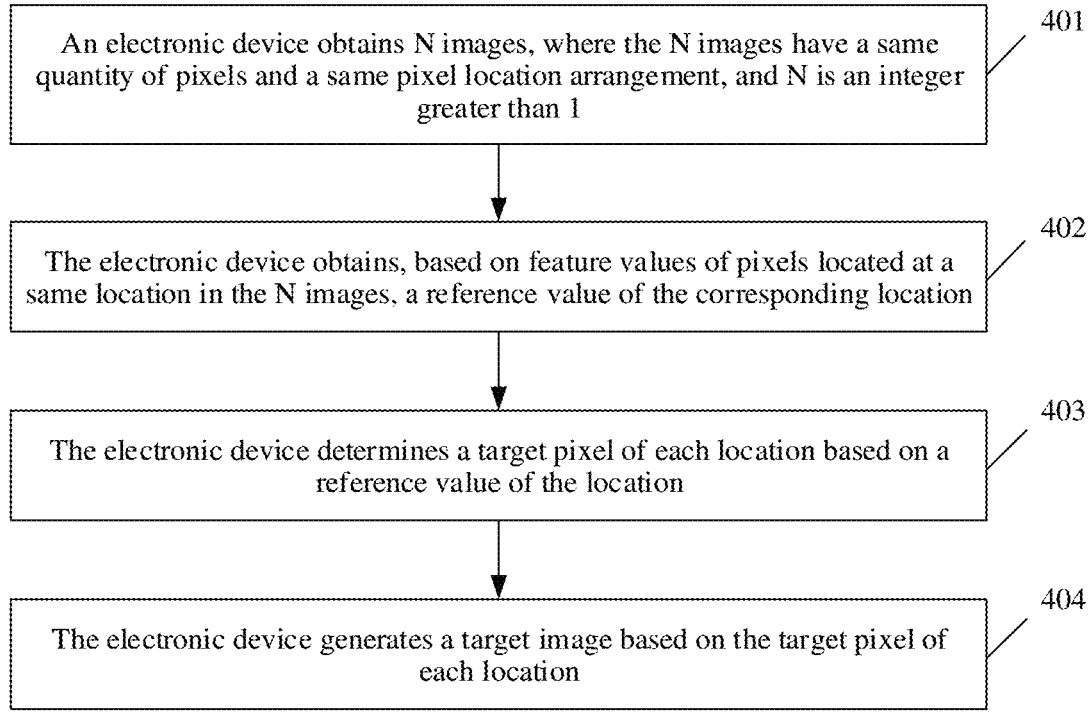
FIG. 4 is a schematic flowchart of an image processing method according to an embodiment.

FIG. 4 is a schematic flowchart of an image processing method according to an embodiment. The image processing method is applicable to the electronic device shown in FIG. 1 to FIG. 3. As shown in FIG. 4, the image processing method includes at least the following steps.

401. The electronic device obtains N images, where the N images have a same quantity of pixels and a same pixel location arrangement, and N is an integer greater than 1.

In this embodiment, that the N images have a same quantity of pixels and a same pixel location arrangement may be understood as that quantities of pixels in the N images are all the same, and arrangements of pixel locations in the N images are also the same. It may also be understood as that the N images have a same resolution. In an embodiment, an image solution may be represented by a quantity of horizontal pixels*a quantity of vertical pixels of an image, or the image solution may be represented by a length*a width of the image. Optionally, a quantity of pixels of each image may be measured by using the quantity of pixels, or may be measured by using a size of the image. To be specific, when the N images are measured by using a same size standard, lengths of the N images are the same, and widths of the N images are also the same. Therefore, in this embodiment, a standard used for determining that the N images have the same quantity of pixels and the same pixel location arrangement is not limited.

In an embodiment, a method for obtaining the N images by the electronic device, for example, is that the electronic device may obtain N video frames in a raw video as the N images. The raw video may be a video shot by a user by using the electronic device, for example, by using the camera 130 shown in FIG. 1, or by using the camera 293 shown in FIG. 2. Alternatively, the raw video may be a video obtained by the user by using the electronic device from a cloud or another electronic device, or the like. A source of the raw video is not limited in this embodiment. A method for obtaining the N video frames from the raw video by the electronic device, for example, is an equally spaced time interval method, or a frame difference method. How the electronic device obtains the N video frames from the raw video is not limited in this embodiment. For example, when the electronic device selects the N video frames from the raw video, the electronic device may select each video frame based on an equally spaced time interval. For example, the electronic device may select each video frame at a time interval of 0.1 s, to obtain the N images.

In an embodiment, the method for obtaining the N images by the electronic device, for example, is that the electronic device may shoot the N images by using the camera 130 shown in FIG. 1, or by using the camera 293 shown in FIG. 2. Alternatively, the N images may be images downloaded by the user from the cloud by using the electronic device or directly obtained from a memory, or the like.

402. The electronic device obtains, based on feature values of pixels located at a same location in the N images, a reference value of the corresponding location.

In an embodiment, the electronic device obtains the reference value of the corresponding location based on the feature values of the pixels located at the same location in the N images, for example, is that the electronic device may obtain the feature values of the pixels with the same location in the N images, and then obtain the reference value of the corresponding location based on the feature values of the pixels with the same location. The corresponding location may be a location related to locations of pixels in the N images. For example, the electronic device may obtain, based on feature values of pixels located at a same location i in the N images, a reference value of the pixels of the location i. The location i is any same location in the N images. In other words, each of the N images has the location i.

In this embodiment, the obtaining, based on feature values of pixels located at a same location in the N images, a reference value of the corresponding location may further be understood as follows: For example, if the feature values of the pixels located at the same location in the N images are respectively f(i, 1), f(i, 2), f(i, 3), . . . , f(i, N−1), and f(i, N), the reference value f(i) of the corresponding location may be obtained based on f(i, 1), f(i, 2), f(i, 3), . . . , f(i, N−1), and f(i, N), where f(i, x) is a feature value of an $i^{th}$ location in an $x^{th}$ image in the N images, and f(i) is the reference value of the location i. In another example, if feature values of pixels of a location j in the N images are respectively f(j, 1), f(j, 2), f(j, 3), . . . , f(j, N−1), and f(j, N), a reference value f(j) of the location j may be obtained based on f(j, 1), f(j, 2), f(j, 3), . . . , f(j, N−1), and f(j, N). It may be understood that, the location i and the location j are merely an example. The N images further include more same locations. Therefore, the location i and the location j shown in this embodiment should not be understood as a limitation on this embodiment. It may be understood that, in that f(i, x) is a feature value of an $i^{th}$ location in an $x^{th}$ image in the N images in this embodiment, the shown $i^{th}$ location is merely an example, and it should be not understood as that the electronic device needs to sort locations in each image. In addition, the $x^{th}$ image is also merely an example, and it should be not understood as that the electronic device needs to sort all of the images. It may be understood that, f(i, x) is merely an example. A specific value of the feature value is not limited in this embodiment.

In some embodiments, because the electronic device obtains the N images, there may be N feature values of pixels located at the same location in the N images. Therefore, the obtaining, based on feature values of pixels located at a same location in the N images, a reference value of the corresponding location includes:

obtaining a set i of feature values based on the feature values of the pixels located at the location i in the N images, where the location i is any same location in the N images; and obtaining the reference value of the location i based on the set i of feature values.

In this embodiment, the set i of feature values may include a feature value of a pixel of the location i of an image 1, a feature value of a pixel of the location i of an image 2, . . . , and a feature value of a pixel of the location i of an image N. Therefore, the electronic device may obtain the reference value of the location i based on the feature value of the pixel of the location i of the image 1, the feature value of the pixel of the location i of the image 2, . . . , and the feature value of the pixel of the location i of the image N. It may be understood that, the reference value of the location i may be obtained by performing some operations or by applying a related rule on the feature values included in the set i of feature values. It may be understood that, the location i is merely an example. In an embodiment, a value of i may be the same as a quantity of pixels of each image.

In this embodiment, for example, the set i of feature values may alternatively be f(i, 1), f(i, 2), f(i, 3), . . . , f(i, N−1), and f(i, N), where f(i, x) is the feature value of the $i^{th}$ location in the $x^{th}$ image in the N images. Therefore, the reference value f(i) of the location i may be obtained based on f(i, 1), f(i, 2), f(i, 3), . . . , f(i, N−1), and f(i, N).

In some embodiments, the obtaining the reference value of the location i based on the set i of feature values includes:

using an average value of the set i of feature values as the reference value of the location i.

In this embodiment, the electronic device may use an average value of the feature values included in the set i of feature values as the reference value of the location i. In an embodiment, the electronic device may use an average value of the feature value of the pixel of the location i of the image 1, the feature value of the pixel of the location i of the image 2, . . . , and the feature value of the pixel of the location i of the image N, namely, N feature values, as the reference value of the location i. For example, using f(i, x) as an example, the reference value of the location i may be obtained based on an average value of f(i, 1), f(i, 2), f(i, 3), . . . , f(i, N−1), and f(i, N).

In some embodiments, the obtaining the reference value of the location i based on the set i of feature values includes:

using a median value of the set i of feature values as the reference value of the location i.

In this embodiment, the electronic device may use a median value of the N feature values included in the set i of feature values as the reference value of the location i. In an embodiment, the electronic device may use a median value of the feature value of the pixel of the location i of the image 1, the feature value of the pixel of the location i of the image 2, . . . , and the feature value of the pixel of the location i of the image N, namely, the N feature values, as the reference value of the location i. It may be understood that, in this case, N may be an integer greater than 2. For example, using f(i, x) as an example, the reference value of the location i may be obtained based on a median value of f(i, 1), f(i, 2), f(i, 3), . . . , f(i, N−1), and f(i, N).

Optionally, the electronic device may further use a mode of the set i of feature values as the reference value of the location i. In an embodiment, the electronic device may use a mode (namely, a feature value that appears for a largest quantity of times) of the feature value of the pixel of the location i of the image 1, the feature value of the pixel of the location i of the image 2, . . . , and the feature value of the pixel of the location i of the image N, namely, the N feature values, as the reference value of the location i.

Figure 5:
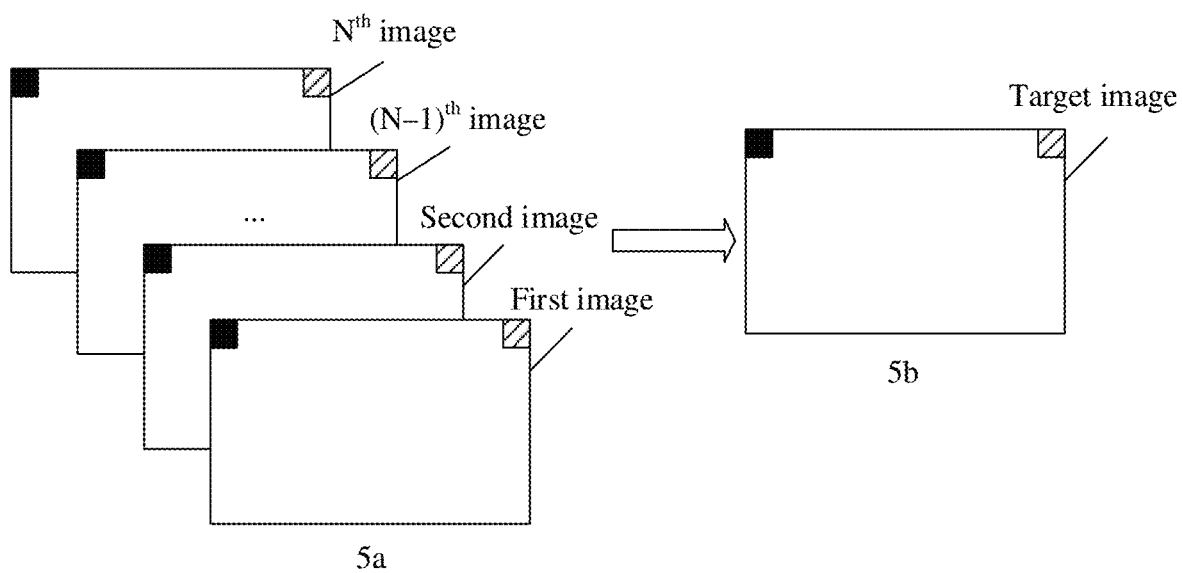
FIG. 5 is a schematic diagram of location matching according to an embodiment.

For example, FIG. 5 is a schematic diagram of location matching according to an embodiment. As shown in 5a in FIG. 5, same locations in the N images may include a pattern shown in an upper right corner and a solid shown in an upper left corner. The electronic device may obtain a reference value of an upper left corner location based on feature values of pixels of the upper left corner location (namely, a black solid block) in the N images, and obtain a reference value of an upper right corner location based on feature values of pixels of the upper right corner location (namely, a pattern block) in the N images. A set of feature values of the upper left corner location in 5a in FIG. 5 may include a feature value of a pixel of the upper left corner location of the first image, a feature value of a pixel of the upper left corner location of the second image, . . . , a feature value of a pixel of the upper left corner location of an $(N-1)^{th}$ image, and a feature value of a pixel of the upper left corner location of an $N^{th}$ image. A set of feature values of the upper right corner location in 5a in FIG. 5 may include a feature value of a pixel of the upper right corner location of the first image, a feature value of a pixel of the upper right corner location of the second image, . . . , a feature value of a pixel of the upper right corner location of the $(N-1)^{th}$ image, and a feature value of a pixel of the upper right corner location of the $N^{th}$ image. It may be understood that, the $N^{th}$ image shown in the figure is merely an example. In an embodiment, the electronic device may not sort the N images. In addition, only four images and two same locations are shown in the figure. A quantity of images and a quantity of same locations shown in 5a in FIG. 5 should not be understood as a limitation on this embodiment.

Further, the reference value of the upper left corner location may be obtained based on an average value of the feature value of the pixel of the upper left corner location of the first image, the feature value of the pixel of the upper left corner location of the second image, . . . , the feature value of the pixel of the upper left corner location of the $(N-1)^{th}$ image, and the feature value of the pixel of the upper left corner location of the $N^{th}$ image, namely, N feature values; or based on a median value of the N feature values; or based on a mode of the N feature values.

Figure 6:
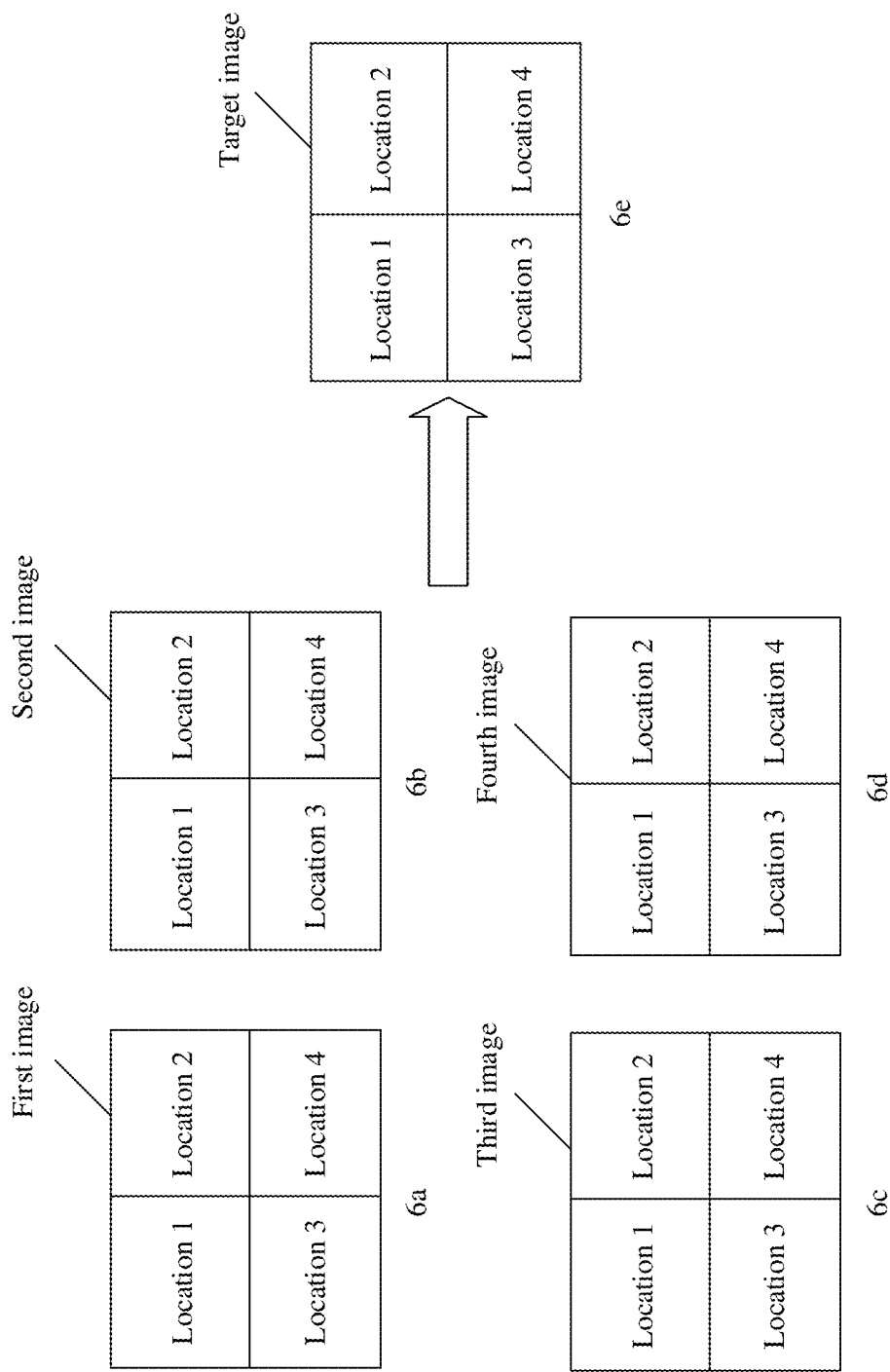
FIG. 6 is a schematic diagram of another location matching according to an embodiment.

For example, FIG. 6 is a schematic diagram of another location matching according to an embodiment. As shown in 6a in FIG. 6, for example, N=4, and each image includes fourth pixel locations (only as an example, and in an embodiment, there may be more pixel locations). Then, the location i including same locations in the four images includes a location 1 in 6a in FIG. 6, a location 1 in 6b in FIG. 6, a location 1 in 6c in FIG. 6, and a location 1 in 6d in FIG. 6; further includes a location 2 in 6a in FIG. 6, a location 2 in 6b in FIG. 6, a location 2 in 6c in FIG. 6, and a location 2 in 6d in FIG. 6; further includes a location 3 in 6a in FIG. 6, a location 3 in 6b in FIG. 6, a location 3 in 6c in FIG. 6, and a location 3 in 6d in FIG. 6; and further includes a location 4 in 6a in FIG. 6, a location 4 in 6b in FIG. 6, a location 4 in 6c in FIG. 6, and a location 4 in 6d in FIG. 6. Therefore, the electronic device may obtain a reference value of the location 1 based on a feature value of a pixel of the location 1 in each image, obtain a reference value of the location 2 based on a feature value of a pixel of the location 2 in each image, obtain a reference value of the location 3 based on a feature value of a pixel of the location 3 in each image, and obtain a reference value of the location 4 based on a feature value of a pixel of the location 4 in each image. It may be understood that, a sequence of images shown in FIG. 6 is merely an example. In an embodiment, the images may not be sorted in this embodiment.

Further, the reference value of the location 1 may be obtained based on an average value of the feature values of the pixels of the location 1 in the images, or based on a median value of the feature values of the pixels of the location 1 in the images, or based on a mode of the feature values of the pixels of the location 1 in the images. The reference value of the location 2 may be obtained based on an average value of the feature values of the pixels of the location 2 in the images, or the like. The reference value of the location 3 may be obtained based on an average value of the feature values of the pixels of the location 3 in the images, or the like. The reference value of the location 4 may be obtained based on an average value of the feature values of the pixels of the location 4 in the images, or the like.

It may be understood that, in this embodiment, a feature value of any pixel in the N images may include a feature value of a local feature of the pixel. The local feature may include a local binary pattern (LBP) local feature, or an improved local binary similarity pattern (LBSP) local feature. In other words, the feature value of any pixel may include one or more of an LBP feature value of the pixel and an LBSP feature value of the pixel. The local binary pattern is an operator used for describing a local texture feature of an image. The LBP feature has prominent advantages such as grayscale invariance and rotation invariance. In the local binary pattern, each pixel in an image may be compared with a neighborhood pixel thereof, a result is stored as a binary number, and an obtained binary bit string is used as an encoded value of a center pixel, namely, an LBP feature value. Optionally, the local feature may alternatively include another feature of an image, for example, a sift feature, a surf feature, or a hog feature of the image. The local feature is not limited in this embodiment. Further, a method for calculating the feature value of the local feature is not uniquely limited in this embodiment.

In this embodiment, the feature value of any pixel may alternatively include one or more of a grayscale value and a squared value. For example, the electronic device may use a grayscale value of any pixel as the feature value of the any pixel. Alternatively, the electronic device may use a squared value of any pixel as the feature value of the any pixel. For example, the electronic device may use a sum of a grayscale value and a squared value of any pixel as the feature value of the any pixel. For example, any pixel may correspond to a three-dimensional vector, such as an RGB vector. For example, if the pixel is (R, G, B), a grayscale value (gray) of the pixel may be $a \times R + b \times G + c \times B$, where $a+b+c=1$. In another example, if the pixel is (R, G, B), a squared value of the pixel is $R^2 + G^2 + B^2$. It may be understood that, when a squared value of any pixel is calculated, if the pixel is (R, G, B), the squared value of the pixel may alternatively be $d \times R^2 + e \times G^2 + f \times B^2$, where specific values of d, e, and f are not limited in this embodiment.

Further, the feature value of the local feature of the any pixel may include one or more of a grayscale value of the local feature of the pixel and a squared value of the local feature of the pixel. Therefore, optionally, in this embodiment, the feature value of any pixel may alternatively include a sum of the feature value of the local feature of the pixel and the grayscale value of the pixel, or the feature value of the any pixel may alternatively include a sum of the feature value of the local feature of the pixel and the squared value of the pixel. In other words, the feature value of any pixel may include one or more of a sum of the grayscale value of the local feature of the pixel and the grayscale value of the pixel, a sum of the grayscale value of the local feature of the pixel and the squared value of the pixel, a sum of the squared value of the local feature of the pixel and the grayscale value of the pixel, and a sum of the squared value of the local feature of the pixel and the squared value of the pixel.

Therefore, how to determine the feature value of any pixel is not uniquely limited in this embodiment.

403. The electronic device determines a target pixel of each location based on a reference value of the location.

In this embodiment, the electronic device may determine, based on a type of a target image, how to obtain the target pixel of each location based on the reference value of each location.

For example, in some embodiments, the determining a target pixel of each location based on a reference value of the location includes:

selecting, from pixels located at the location j in the N images, a pixel whose feature value has a smallest difference from the reference value of the location j as a target pixel of the location j, where the location j is any same location in the N images.

In this embodiment, for example, the electronic device may first select, from a set j of feature values, a target feature value that has a smallest difference from the reference value of the location j, and then use a pixel corresponding to the target feature value as the target pixel of the location j. In an embodiment, the electronic device may select, from N pixels of the location j in the N images, a pixel whose feature value has a smallest difference from the reference value of the location j as the target pixel of the location j. In other words, the electronic device selects, from the N pixels of the location j in the N images, a pixel whose feature value is closest to the reference value of the location j as the target pixel of the location j. The pixel whose feature value has a smallest difference from the reference value of the location j may include a pixel whose feature value is the same as the reference value of the location j. For example, if the pixels of the location j in the N images are respectively y(j, 1), y(j, 2), y(j, 3), . . . , y(j, N−1), and y(j, N), a pixel whose feature value has a smallest difference from the reference value f(j) of the location j, for example, y(j, x1) may be selected therefrom, so that y(j, x1) is used as the target pixel of the location j. It may be understood that, a feature value of y(j, 1) is f(j, 1) in the foregoing embodiment, . . . , and a feature value of y(j, x1) is f(j, x1). In an embodiment, a feature value, for example, f(j, x1), which has a smallest difference from f(j) may be selected from a set of feature values f(j, 1), f(j, 2), . . . , and f(j, N), so that the pixel y(j, x1) corresponding to f(j, x1) is used as the target pixel of the location j.

For example, using FIG. 6 as an example, the electronic device may select, from the pixels of the location 1 in the images, a pixel whose feature value has a smallest difference from the reference value of the location 1 as a target pixel of the location 1. In an embodiment, the target pixel of the location 1 may be the pixel of the location 1 in 6a in FIG. 6, or the pixel of the location 1 in 6b in FIG. 6, or the pixel of the location 1 in 6c in FIG. 6, or the pixel of the location 1 in 6d in FIG. 6.

In an embodiment, for example, if the feature values of the pixels of the location 1 in the images are sequentially 20, 25, 30, and 100, the reference value of the location 1 may be an average value 43.75, and the target pixel of the location 1 may be a pixel whose feature value is 30, which has a smallest difference from 43.75, namely, the pixel of the location 1 in 6c in FIG. 6. It may be understood that, the foregoing values are merely an example, and should not be understood as a limitation on this embodiment.

For example, in some embodiments, the determining a target pixel of each location based on a reference value of the location includes:

selecting, from the pixels located at the location j in the N images, a pixel whose feature value has a largest difference from the reference value of the location j as the target pixel of the location j, where the location j is any same location in the N images.

In this embodiment, for example, the electronic device may first select, from the set j of feature values, a target feature value that has a largest difference from the reference value of the location j, and then use a pixel corresponding to the target feature value as the target pixel of the location j. In an embodiment, the electronic device may select, from N pixels of the location j in the N images, a pixel whose feature value has a largest difference from the reference value of the location j as the target pixel of the location j. In other words, the electronic device selects, from the N pixels of the location j in the N images, a pixel whose feature value is farthest from the reference value of the location j as the target pixel of the location j.

For example, using FIG. 6 as an example, the electronic device may select, from the pixels of the location 1 in the images, a pixel whose feature value has a largest difference from the reference value of the location 1 as the target pixel of the location 1. In an embodiment, the target pixel of the location 1 may be the pixel of the location 1 in 6a in FIG. 6, or the pixel of the location 1 in 6b in FIG. 6, or the pixel of the location 1 in 6c in FIG. 6, or the pixel of the location 1 in 6d in FIG. 6.

In an embodiment, for example, if the feature values of the pixels of the location 1 in the images are sequentially 20, 25, 30, and 100, the reference value of the location 1 may be an average value 43.75, and the target pixel of the location 1 may be a pixel whose feature value is 100, which has a largest difference from 43.75, namely, the pixel of the location 1 in 6c in FIG. 6. It may be understood that, the foregoing values are merely an example, and should not be understood as a limitation on this embodiment.

404. The electronic device generates the target image based on the target pixel of each location.

In this embodiment, a quantity of pixels of the target image generated by the electronic device is the same as the quantity of pixels of each of the N images, and a pixel location arrangement of the target image is the same as the pixel location arrangement of each of the N images. After the electronic device obtains the target pixel of each location based on step 401 to step 403, the electronic device may generate the target image based on the target pixel of each location. For example, the electronic device may fill the target pixel of the location i into the location i of the target image, and fill the target pixel of the location j into the location j of the target image. Alternatively, the electronic device may directly arrange the target pixels of the locations based on pixel locations of the N images, and then generate the target image, or the like. How the electronic device generates the target image based on the target pixel of each location is not limited in this embodiment. For example, the feature value of the $i^{th}$ location in the $x^{th}$ image in the N images is identified by using f(i, x) in the foregoing embodiment, and the feature values of the pixels located at the same location in the N images are respectively f(i, 1), f(i, 2), f(i, 3), . . . , f(i, N−1), and f(i, N), and the reference value of the location i is f(i). In another example, the feature values of the pixels of the location j in the N images are respectively f(j, 1), f(j, 2), f(j, 3), . . . , f(j, N−1), and f(j, N), and the reference value of the location j is f(j). Then, the electronic device may determine the target pixel of the location i based on f(i), and determine the target pixel of the location j based on f(j), to generate the target image based on the target pixel of the location i and the target pixel of the location j. The pixel of the location i in the target image is obtained based on f(i), and the pixel of the location j in the target image is obtained based on f(j).

For example, using FIG. 5 as an example, after obtaining the reference value of the upper left corner location based on the feature values of the pixels of the upper left corner location in 5a in FIG. 5, the electronic device may determine a target pixel of the upper left corner location based on the reference value of the upper left corner location, thereby obtaining the pixel at the upper left corner of the target image in 5b in FIG. 5. In other words, the target pixel determined by the electronic device based on the reference value of the upper left corner location may be the pixel of the upper left corner location of the target image.

In another example, using FIG. 6 as an example, the electronic device may obtain the reference value of the location 1 based on the feature values of the pixels of the location 1 in the images in 6a to 6d in FIG. 6, and then obtain the target pixel of the location 1 based on the reference value of the location 1. Therefore, the pixel of the location 1 in 6e in FIG. 6 is the target pixel of the location 1 obtained by the electronic device. Correspondingly, the electronic device may further obtain the reference value of the location 2 based on the feature values of the pixels of the location 2 in the images in 6a to 6d in FIG. 6, and the target pixel determined based on the reference value of the location 2 is the pixel of the location 2 in 6e in FIG. 6. A method for determining the pixels of the location 3 and the location 4 in 6e in FIG. 6 is not described in detail herein again.

In this embodiment, the reference value of the corresponding location is obtained based on the feature values of the pixels of the same location in the N images, to obtain the target pixel of each location based on the reference value of each location, thereby generating the target image based on the target pixel of each location. This avoids generating an image through a manual selection of a user, to automatically implement synthesis of an image.

During actual application, a user usually shoots a video of a moving object by using the electronic device. In other words, the raw video may include a target object, and in the raw video, the target object is moving. It may be understood that, the target object may be a human, an animal, or the like. For example, the target object may be further understood as a body part other than a background. The target object may also be referred to as a target subject, a subject, a moving subject, or the like. A name of the target object is not uniquely limited in this embodiment.

In this case, by using the method shown in FIG. 4, the electronic device may not only obtain a background image including no target object, but also obtain a still image including clones of the target object. The foregoing describes in detail how the electronic device obtains the background image and the still image that includes clones of the target object.

A method for generating the still image including clones of the target object is shown as follows.

In some embodiments, to improve an effect of the target image generated by the electronic device, the N images obtained by the electronic device may be images including the target object, and locations of the target object in the N images are different.

In this case, that locations of the target object in the N images are different may be understood as a case in which the locations of the target object in the images do not overlap at all, or understood as a case in which the locations of the target object in the N images are different, but the locations of the target object overlap in at least two images. In other words, pixel locations included in the target object do not overlap in the images at all, or the pixel locations included in the target object overlap in at least two of the N images.

Figure 8:
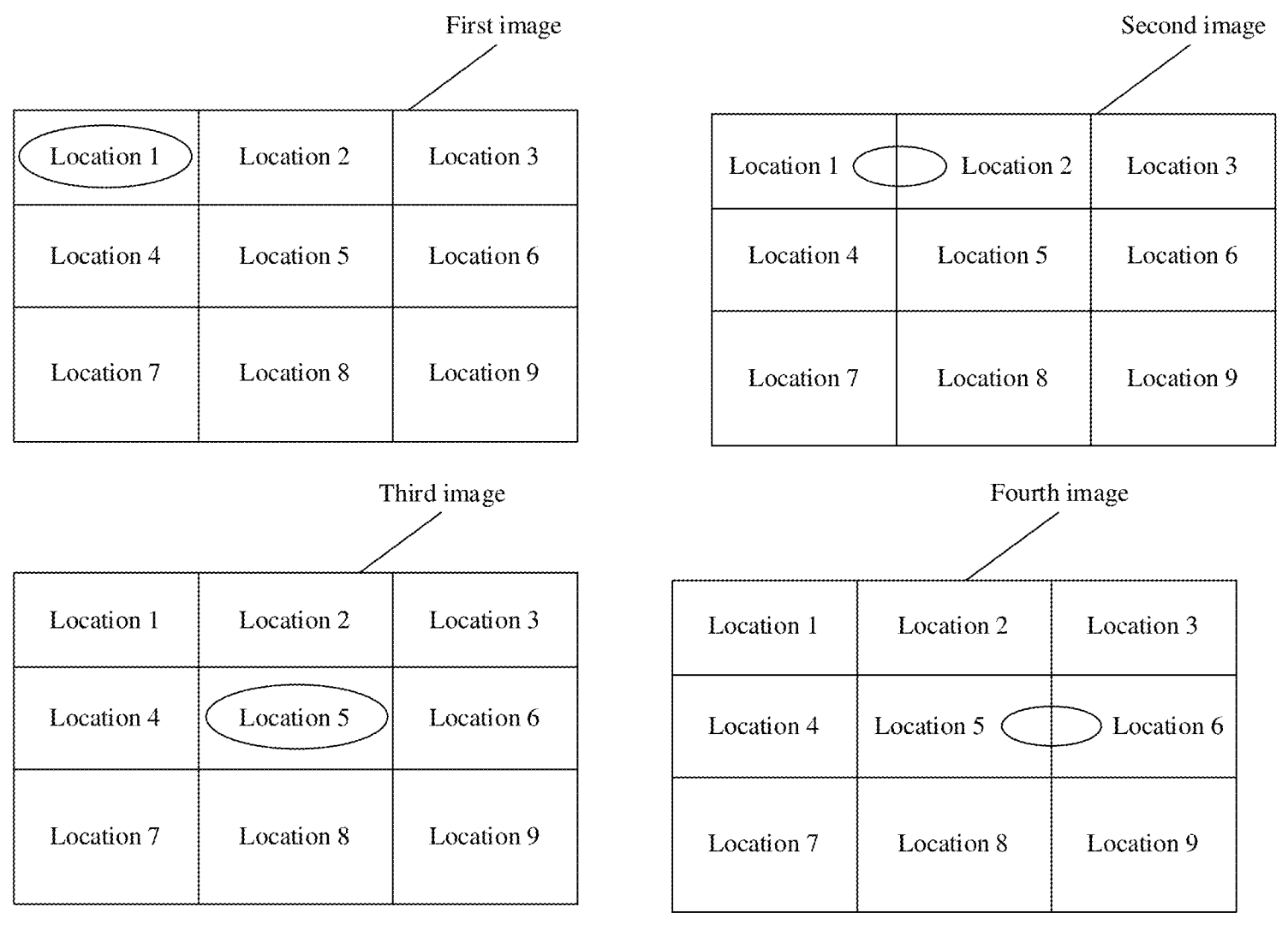

For example, using FIG. 7 and FIG. 8 as an example, an ellipse shown in the figures is used as the target object, and N=4. Then, the locations of the target object in FIG. 7 are sequentially a location 1, a location 3, a location 5, and a location 6 in the four images. The locations of the target object in FIG. 8 are sequentially a location 1, a location 1 and a location 2, a location 5, and a location 5 and a location 6 in the four images. Because the locations of the target object in FIG. 7 do not overlap at all, when the electronic device generates the target image based on the four images, an effect of the target image is obviously better than an effect of the target image generated by the electronic device based on the four images in FIG. 8. For example, the target image generated based on the four images in FIG. 8 also includes four target objects, but the four target objects in the target image overlap, or the like. It may be understood that a specific quantity of pixels included in the target object is not limited in this embodiment.

Figure 9:
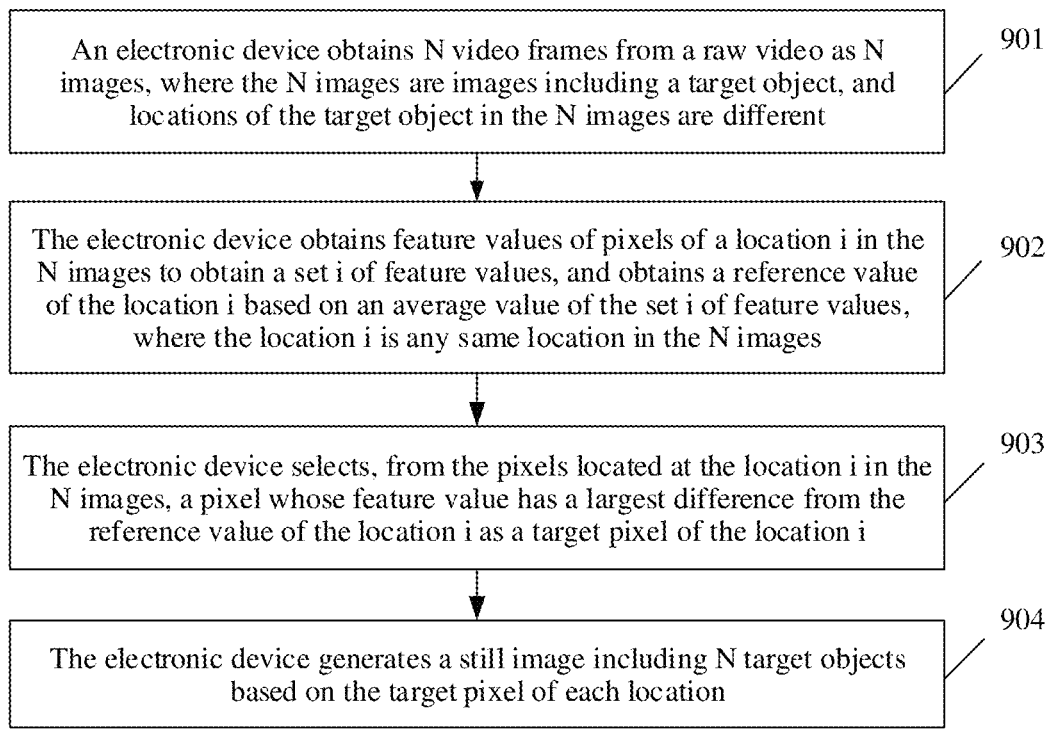
FIG. 9 is a schematic flowchart of another image processing method according to an embodiment.

Therefore, FIG. 9 is a schematic flowchart of a method for generating a still image according to an embodiment. The method is applicable to an electronic device. As shown in FIG. 9, the method includes the following steps.

901. The electronic device obtains N video frames from a raw video as N images, where the N images are images including a target object, and locations of the target object in the N images are different.

Optionally, to further improve an effect of a target image, in the raw video obtained by the electronic device, when a moving speed of the target object varies at different moments, the electronic device may obtain a variation of the target object between adjacent frames by using a frame difference method, and select the N images based on the variation. If a frame difference between the adjacent frames is relatively large, for example, is greater than a frame difference threshold, it indicates that the target object moves relatively quickly, and the electronic device may select a relatively large quantity of video frames as the N images. If the frame difference between the adjacent frames is relatively small, for example, is less than the frame difference threshold, to prevent the target object in some of the N images from overlapping in space, a relatively small quantity of video frames may be selected as the N images. It may be understood that, the frame difference threshold may be set by a user, may be set by the electronic device, or the like. A method for setting the frame difference threshold is not limited in this embodiment. The frame difference threshold is a threshold used for measuring a frame difference size between the adjacent frames. Therefore, a specific value of the frame difference threshold is not limited in this embodiment.

Optionally, the electronic device may alternatively obtain the N video frames by using an equally spaced time interval method as the N images, or the like.

Optionally, to improve a display effect of the target image, a luminance variation between any two of the N images may alternatively not exceed a luminance variation threshold. For example, the electronic device may separately calculate an average luminance of each image, and then determine a luminance variation of the N images based on a relationship between a difference between average luminances of the images and the luminance variation threshold. It may be understood that, the luminance variation threshold may be set by the user by using the electronic device, may be autonomously set by the electronic device, or the like. This is not limited in this embodiment. In addition, a specific value of the luminance variation threshold is not limited in this embodiment. Optionally, to improve quality and the effect of the target image, in another example, scenarios of any two of the N images at least partially overlap. In an embodiment, scenarios of any two of the N images are the same (or it is understood that backgrounds are the same), or the like. Requirements for the N images are not uniquely limited in this embodiment.

902. The electronic device obtains feature values of pixels of a location i in the N images to obtain a set i of feature values, and obtains a reference value of the location i based on an average value of the set i of feature values, where the location i is any same location in the N images.

It may be understood that, for a specific implementation of step 902, refer to the specific implementation shown in FIG. 4. Details are not described herein again.

903. The electronic device selects, from the pixels located at the location i in the N images, a pixel whose feature value has a largest difference from the reference value of the location i as a target pixel of the location i.

904. The electronic device generates a still image including N target objects based on the target pixel of each location.

In this embodiment, when the target pixel of the location i selected by the electronic device is a pixel whose feature value has a largest difference from the reference value of the location i, the target pixel of the location i may be a pixel of a background, or may be a pixel of the target object. If the target pixel of the location i is not greatly different from the pixels of the location i in the N images, the target pixel of the location i may be the pixel of the background, and otherwise, the target pixel of the location i may be the pixel of the target object. Because a case in which same locations in the N images are all the background may occur, the target pixel of the location i may be the pixel of the background. If the same locations in the N images may not be all the background, namely, the same location in one or more (less than N) images is the target object, the target pixel of the location i may be the pixel of the target object. The target image obtained by using this method not only may include the target object, but also may include the background, and the image is automatically synthesized.

Further, in this embodiment, the target object is moving, in other words, in the N images, the target object is not located at a same location. Therefore, when the electronic device selects, from the pixels located at the location i in the N images, the pixel whose feature value has a largest difference from the reference value of the location i as the target pixel of the location i, the target pixel of the location i obtained by the electronic device may be a pixel of the target object in an image, or the target pixel of the location i obtained by the electronic device may be a pixel of the background in an image. Using FIG. 7 as an example, for a location 2, a pixel selected by the electronic device from pixels of the location 2 in four images is still a pixel of the background, and a pixel of the location 2 in the target image is the pixel of the background. For a location 1, because pixels of the location 1 in the second image, the third image, and the fourth image are pixels of the background, and there is not a large difference between the pixels of the background, when the electronic device selects, from the pixels of the location 1, a target pixel of the location 1, the target pixel of the location 1 is a pixel of the location 1 in the first image. By this analogy, the target image generated by the electronic device after the electronic device traverses all the same locations in the four images may be shown in FIG. 10. Namely, the target image generated by the electronic device is an image including four target objects. In other words, the target image generated by the electronic device includes clones of the target object.

Figure 10:
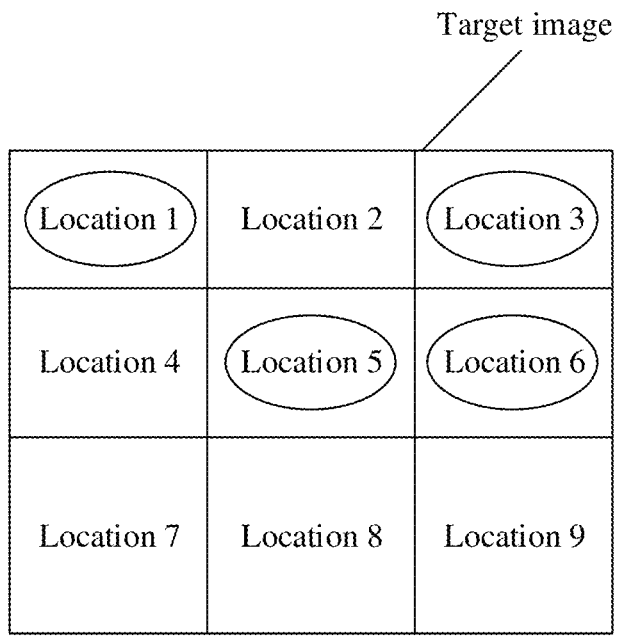
FIG. 10 is a schematic diagram of a target image generated based on FIG. 7 according to an embodiment.
Figures 11, 12:
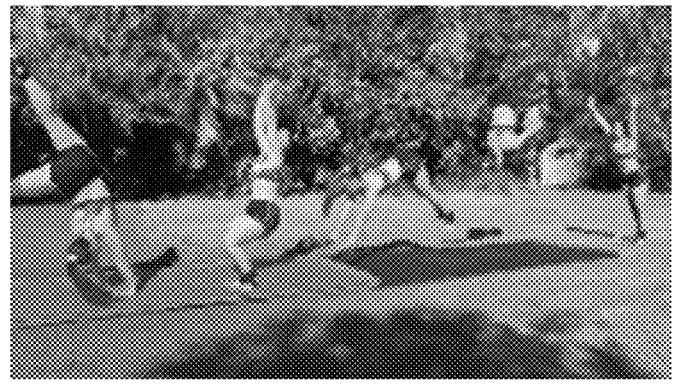
FIG. 11 is a schematic diagram of another target image according to an embodiment.
FIG. 12 is a schematic diagram of a target image generated based on FIG. 7 according to an embodiment.

FIG. 11 is a schematic diagram of a target image according to an embodiment. As shown in FIG. 10, a moving person in the figure may be understood as a target object, and FIG. 11 shows different clones of the target object.

It may be understood that, when an electronic device obtains N−1 video frames from a raw video, the electronic device may generate an image including N−1 target objects based on the method shown in FIG. 9. In other words, a quantity of the target objects included in the target image generated by using the method shown in FIG. 9 is the same as N.

For example, steps of obtaining a still image (including N clones) may include:
(1). Obtain N video frames from the raw video as N images, and stack the N images into an image stack with a dimension of 3*W*H*N, where 3 represents a quantity of channels of the image, namely, RGB channels, W and H may respectively represent a width and a height of each image, and N represents the N images.
(2). Perform feature conversion on pixels in the images of the image stack, to obtain feature values of the pixels in the images.
(3). Calculate, based on the feature values of the pixels in the images, a median value (or an average value) of feature values of pixels located at a same location i in the images, namely, determine a reference value of the location i.
(4). Calculate, based on the feature values of the pixels located at the same location i in the N images, an index of a feature value that is farthest from the median value (or the average value) of the feature values of the pixels located at the same location i in the N images and that is in the feature values of the pixels located at the same location i in the N images, namely, determine, from the feature values of the pixels located at the same location i in the N images, the index of the feature value farthest from the reference value of the location i.
(5). Extract RGB values of pixels of a corresponding image (namely, an image in which a pixel whose feature value is farthest from the reference value of the location i is located) by using the index obtained in step (4), to obtain the still image.

In this embodiment, the pixel whose feature value has a largest difference from the reference value of the location i is selected as the target pixel of the location i, to generate the target image, and the target image is the still image including the clones of the target object. This avoids generating an image through a manual selection of a user, to fully automatically implement combination of the image. In addition, images including the target object are obtained as the N images, and pixel locations of the target object in the N images do not overlap at all, to effectively improve quality of the image, improve a display effect of the image, and avoid a case in which the clones in the generated target image overlap.

It may be understood that, when the electronic device generates the image including the clones of the target object, for example, in a process of obtaining the N images, to further enhance the effect of the target image, the electronic device may further additionally add M background images that do not include the target object. In this way, robustness of the image is increased, making the display effect of the target image better.

For example, steps of obtaining the target image may include:
(1). Stack K images and (C—K) background images into an image stack with a dimension of 3*W*H*C.
(2). Perform feature conversion on pixels in the images of the image stack, to obtain feature values of the pixels in the images.
(3). Calculate, based on the feature values of the pixels in the images, a median value (or an average value) of feature values of pixels located at a same location i in the images.
(4). Calculate, based on the feature values of the pixels located at the same location i in the C images, an index of a feature value that is farthest from the median value (or the average value) of the feature values of the pixels located at the same location i in the N images and that is in the feature values of the pixels located at the same location i in the C images.
(5). Extract RGB values of pixels of a corresponding image by using the index obtained in step (4), to obtain the still image including K target objects.

It may be understood that, a method for generating a background image may be shown as follows.

Because a pixel of an image that does not include the target object, namely, the background image is not greatly different from pixels located at a same location in the N images, the electronic device may select, from pixels of a location j in the N images, a pixel whose feature value has a smallest difference from a reference value of the location j as a target pixel of the location j. Therefore, the target pixel of the location j is the pixel of the background. Using FIG. 7 as an example, if the reference value of the location j is obtained based on a median value of feature values of the pixels of the location j in the N images, for a location 1 in the images in FIG. 7, because a pixel of the background is greatly different from a pixel of the target object, a target pixel of the location 1 may be a pixel of the location 1 in the second image, or a pixel of the location 1 in the third image, or a pixel of the location 1 in the fourth image. A target pixel of a location 2 in FIG. 7 may be a pixel of the location 2 in the first image, or a pixel of the location 2 in the second image, or a pixel of the location 2 in the third image, or a pixel of the location 2 in the fourth image. By this analogy, the target image generated by the electronic device may be shown in FIG. 12. It can be learned from FIG. 12 that the target image generated by the electronic device does not include the target object. Namely, the target object is the background image in the raw video.

Figure 13:
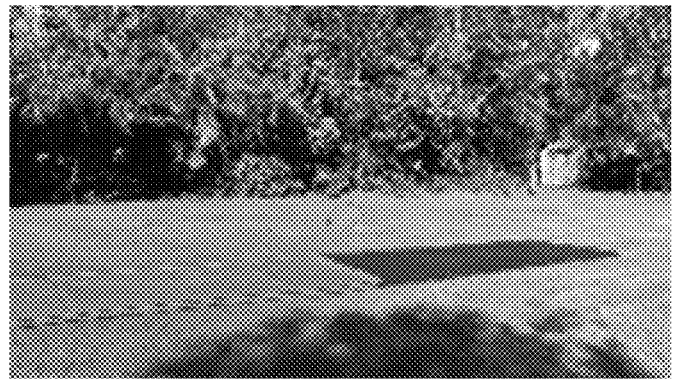
FIG. 13 is a schematic diagram of still another target image according to an embodiment.

FIG. 13 is a schematic diagram of a target image according to an embodiment. A background in FIG. 13 is the same as that in FIG. 11. Namely, FIG. 11 and FIG. 13 are obtained by processing a same original video. As shown in FIG. 13, an image that does not include a target object and that is generated by an electronic device is a background image.

For example, steps of obtaining the background image may include:
(1). Select 10 video frames from the raw video at equal intervals as 10 images.
(2). Perform feature conversion on pixels in the images, to obtain feature values of the pixels in the images.
(3). Calculate, based on the feature values of the pixels in the images, an index of a median value (or an average value) of feature values of pixels located at a same location i in the 10 images, namely, determine, from the feature values of the pixels located at the same location i in the 10 images, the index of the feature value closest to the reference value of the location i.
(4). Extract RGB values of pixels of a corresponding image (namely, an image in which a pixel whose feature value is closest to the reference value of the location i is located) by using the index obtained in step (3), to obtain the background image.

It may be understood that, the foregoing is merely an example, and a quantity therein should be not considered as a limitation on this embodiment.

It may be understood that, the foregoing embodiments have different emphasis. For an implementation that is not described in detail in one embodiment, reference may also be made to an implementation in another embodiment. Details are not described herein again.

Optionally, during actual application, in a process in which a user shoots an image or a video by using an electronic device, hands of the user usually tremble, affecting shooting of the image or the video. Therefore, in some embodiments, after N images are obtained, the N images may be further aligned and tailored, to eliminate an adverse consequence caused by hand trembling. For example, after the electronic device obtains the N images, and before the obtaining, based on feature values of pixels located at a same location in the N images, a reference value of the corresponding location, the foregoing method further includes:
aligning the N images, to make the N images aligned; and
determining an effective region of each of the N images, where effective regions of the N images the same.

The obtaining, based on feature values of pixels located at a same location in the N images, a reference value of the corresponding location includes:
obtaining, based on feature values of pixels located at a same location in the effective regions of the N images, the reference value of the corresponding location.

In this embodiment, after aligning the N images, the electronic device can quickly and effectively determine the effective region of each of the N images, to improve a processing speed of the electronic device. Optionally, the electronic device may further obtain a reference image from the N images, perform an alignment operation based on the reference image, namely, align remaining N−1 frames of images with the reference image, and then obtain, through tailoring, the effective region of each of the N images after alignment. The effective region may also be understood as a common region between the N images.

For example, specific steps of the foregoing alignment and tailoring operation are described by using an example in which the electronic device performs alignment based on the reference image. For example, the specific steps may include:
(1). Perform feature point and descriptor (oriented FAST and rotated BRIEF, ORB) key point detection on the N images. For example, each image may be divided into 20×20 (only an example) grids, and for key points in each grid, key points with largest responses are kept based on a non-maximum suppression method, and descriptors are calculated for the key points with largest responses. Therefore, robustness of alignment can be improved by obtaining uniformly distributed key points in each image (namely, the kept key points with largest responses).
(2). Match the kept key points with largest responses in each of N−1 images (except the reference image) with key points in the reference image based on descriptors, to determine a homography transform matrix used for alignment.

(3). Transform each image (except the reference image in the N images) based on the homography transform matrix, to align the image with the reference image.

(4). Tailor a common region of the N images after aligning the N images. For example, each image may be scanned row by row (and column by column). For example, if adjacent Y (for example, Y may be 10) pixels of an image are all 0 (indicating black), it may be considered that the row (column) is not within the effective region of the image. The effective regions of the N images may be effectively determined by using the method. In an embodiment, the effective region may be understood as an intersection set or a common region of regions of the images. Optionally, an effective region of an image may alternatively be determined by using a plurality of images.

It may be understood that, the foregoing steps may all be implemented by invoking an OpenCV (open source computer vision library). The foregoing alignment and tailoring method is not limited in this embodiment. In some embodiments, another method or the like may be further included.

It may be understood that the foregoing embodiments are shown when the electronic device obtains the target image. In some embodiments, the electronic device may further obtain a target video based on the N images and the target image. Therefore, based on the method shown in the foregoing embodiments, when each of the N images includes the target object, the method further includes:

The electronic device synthesizes the target video based on the target image and the N images, where the target video is a video in which the target objects constantly decrease with a play order of the target video.

Optionally, the electronic device may further synthesize the target video based on the target image and the N images, where the target video is a video in which the target objects constantly increase with a play order of the target video.

In the embodiments, the target image is a still image that includes the target object, and a background image including no target object. A still image that includes N target objects and a background image including no target object may be obtained by using the method described in the foregoing embodiments. Therefore, the electronic device may separately obtain a still image including N−1 target objects (namely, N−1 images), a still image including N−2 target objects, . . . , and a still image including one target object based on the method described in the foregoing embodiments. It may be understood that, in this embodiment, the still images obtained by the electronic device by using the foregoing method may all be understood as the target image. Therefore, the electronic device may synthesize the target video based on the target image and the N images. In an embodiment, the electronic device may superpose each target image and the N images, to finally synthesize the target video. To improve a display effect of the target video, the electronic device may alternatively synthesize the target video based on the target image and video frames included in the raw video. The following provides description by using an example in which the electronic device synthesizes the target video based on the target image and the video frames included in the raw video. For example, the raw video includes M video frames, in other words, the raw video includes M images, and the M images include N images.

In an embodiment, obtaining the target video based on the target image and the N images includes:
determining locations of the N images in the M images; and
synthesizing the target video based on the locations of the N images in the M images, the target image, and the M images.

In this embodiment, the electronic device may separately determine the locations of the N images in the M images, namely, determine indexes of the N images in the M images. Then, the target video is obtained based on the indexes of the N images in the M images, the still image including N target objects, the still image including N−1 target objects, . . . , the still image including one target object, and the background image.

Optionally, the electronic device may separately superpose the still image including N target objects with the first image to a $K^{th}$ image in the M images, to generate a reference image, and separately superpose the still image including N−1 target objects with a $(K+1)^{th}$ image to a $(K+X)^{th}$ image in the M images, to generate a reference image, or the like, so that the electronic device may perform synthesis based on the obtained reference images, thereby generating video images in which the target objects constantly decrease with a play order of the target video. Specific values of K and X are related to the locations of the N images in the M images.

To more vividly understand a method for generating the target video provided in this embodiment, for example, it is assumed that the electronic device obtains K images from the raw video, and indexes of the K images are $i_1, i_2, \ldots, i_K$, namely, the K images are an $i_1^{th}$ frame of image, an $i_2^{th}$ frame of image, . . . , and an $i_K^{th}$ frame of image in the raw video.

(1). Separately obtain a still image $Comb_K$ including K target objects, a still image $Comb_{K-1}$ including K−1 target objects, . . . , and a still image $Comb_1$ including one target object based on the methods shown in FIG. 4 and FIG. 8.

(2). Superpose the first frame to the $i_1^{th}$ frame of the video with $Comb_K$, to generate a corresponding superposed image (namely, the reference image). A method for superposition is: RGB values of pixels of a location i in the first frame to the $i_1^{th}$ frame of the video+RGB values of a pixel of the location i in the still image−RGB values of a pixel of the location i in the background image. It may be understood that, whether the $i_1^{th}$ frame of the video is superposed with $Comb_K$ is not limited in this embodiment. In other words, whether the pixels in the K images are superposed with the obtained still image is not limited in this embodiment. It may be understood that, the location i is any location in an image.

(3). Superpose an $(i_1+1)^{th}$ frame to the $i_2^{th}$ frame of the video with $Comb_{K-1}$, to generate a corresponding superposed image. By this analogy, an $(i_{K-1}+1)^{th}$ frame to the $i_K^{th}$ frame of the video are superposed with $Comb_1$, to generate a corresponding superposed image.

(4). An $(i_{K+1}+1)^{th}$ frame to the last frame of the video (namely, the $(i_{K+1}+1)^{th}$ frame to the $N^{th}$ frame of the video) remain unchanged.

(5). Synthesize the superposed images obtained in the foregoing into a video, to obtain the video in which the target objects constantly decrease with a play order of the video.

Optionally, the electronic device may alternatively separately superpose the still image including one target object with the $K^{th}$ image to the $(K+X)^{th}$ image in the M images, to generate a reference image, and separately superpose the still image including two target objects with a $(K+X+1)^{th}$ image to a $(K+X+Y)^{th}$ image in the M images, to generate a reference image, or the like, so that the electronic device may perform synthesis based on the obtained reference images, thereby generating a video in which the target objects constantly increase with a play order of the video. Specific values of K, X, and Y are related to the locations of the N images in the M images.

To more vividly understand a method for generating the target video provided in this embodiment, for example, it is assumed that the electronic device obtains K images from the raw video, and indexes of the K images are $i_1, i_2, \ldots, i_K$, namely, the K images are an $i_1{}^{th}$ frame of image, an $i_2{}^{th}$ frame of image, ..., and an $i_K{}^{th}$ frame of image in the raw video.

(1). Separately obtain a still image $Comb'_1$ including one target object, a still image $Comb'_2$ including two target objects, ..., and a still image $Comb'_K$ including K target objects based on the methods shown in FIG. 4 and FIG. 9.

(2). The first frame to the $i_1{}^{th}$ frame of the video remain unchanged.

(3). Superpose an $(i_1+1)^{th}$ frame to the $i_2{}^{th}$ frame of the video with $Comb'_1$, to generate a corresponding superposed image. A method for superposition is: RGB values of pixels of a location i in the $(i_1+1)^{th}$ frame to the $i_2{}^{th}$ frame of the video+RGB values of a pixel of the location i in the still image−RGB values of a pixel of the location i in the background image.

(4). Superpose an $(i_2+1)^{th}$ frame to an $i_3{}^{th}$ frame of the video with $Comb'_2$, to generate a corresponding superposed image. By this analogy, an $(i_K+1)^{th}$ frame to the last frame of the video are superposed with $Comb'_K$, to generate a corresponding superposed image.

(5). Synthesize the superposed images obtained in the foregoing into a video, to obtain the video in which the target objects constantly increase with a play order of the video.

Figure 14:
FIG. 14 is a schematic diagram of a target video according to an embodiment.
Figure 15:
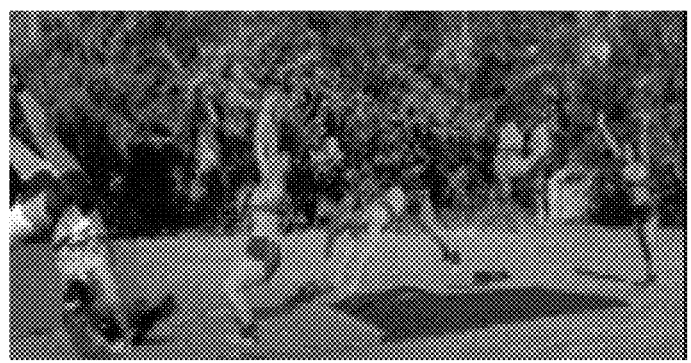
FIG. 15 is a schematic diagram of another target video according to an embodiment.

FIG. 14 and FIG. 15 are schematic diagrams of a target video according to an embodiment. FIG. 14 shows a video in which the target objects constantly decrease with a play order of the video. In an embodiment, with playing of the target video, clones of the target object in the video constantly decrease. FIG. 15 shows a video in which the target objects constantly increase with a play order of the video. In an embodiment, with playing of the target video, clones of the target object in the video constantly increase. A specific quantity of the clones in the video shown in FIG. 14 and FIG. 15 may be related to the selected N images. Details are not described herein again.

It may be understood that, after the electronic device obtains the target image and the target video, the electronic device may further share the target image and the target video, for example, share the target image and the target video to each application, video software, or the like. A place to which the target image and the target video are shared is not limited in the embodiments. It may be understood that, the foregoing embodiments have different emphasis. For an implementation that is not described in detail in one embodiment, reference may also be made to another embodiment.

Figure 16:
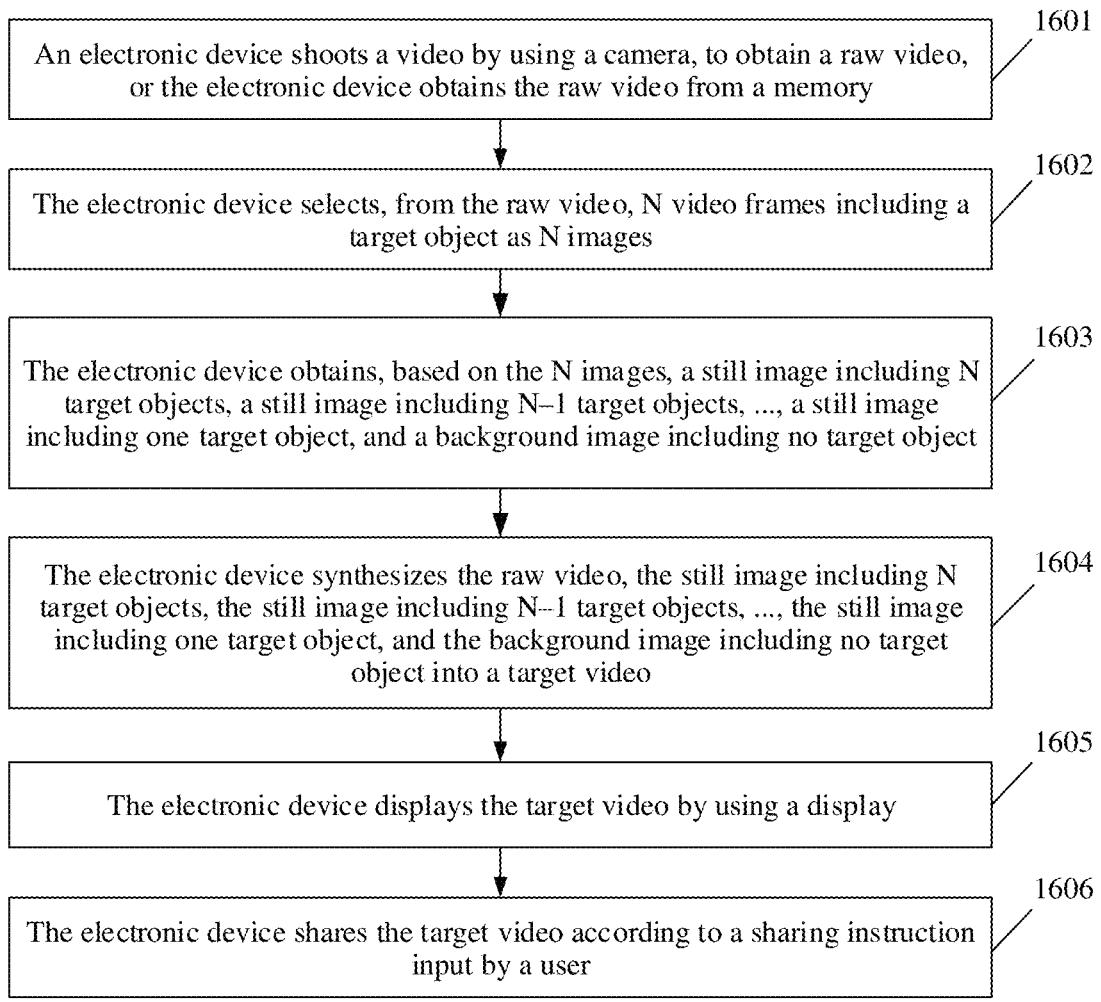
FIG. 16 is a schematic scenario diagram of an image processing method according to an embodiment.

To more vividly understand the image processing method provided in the embodiments, FIG. 16 is a schematic scenario diagram of an image processing method according to an embodiment. The method is applicable to the electronic device shown in FIG. 1 and FIG. 2. As shown in FIG. 16, the image processing method includes the following steps.

1601. The electronic device shoots a video by using a camera, to obtain a raw video, or the electronic device obtains the raw video from a memory.

Figure 17:
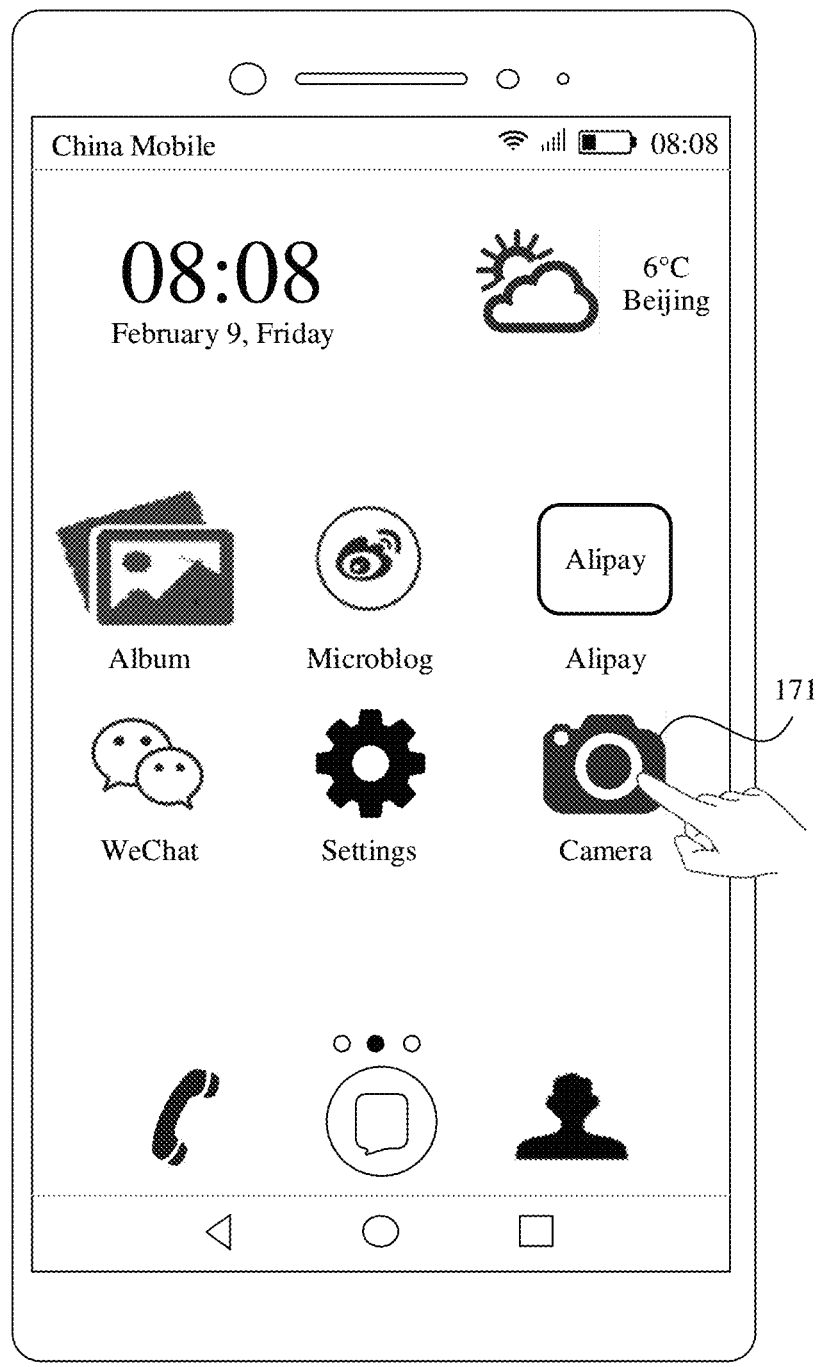
FIG. 17 is a schematic scenario diagram of obtaining an image according to an embodiment.
Figure 18:
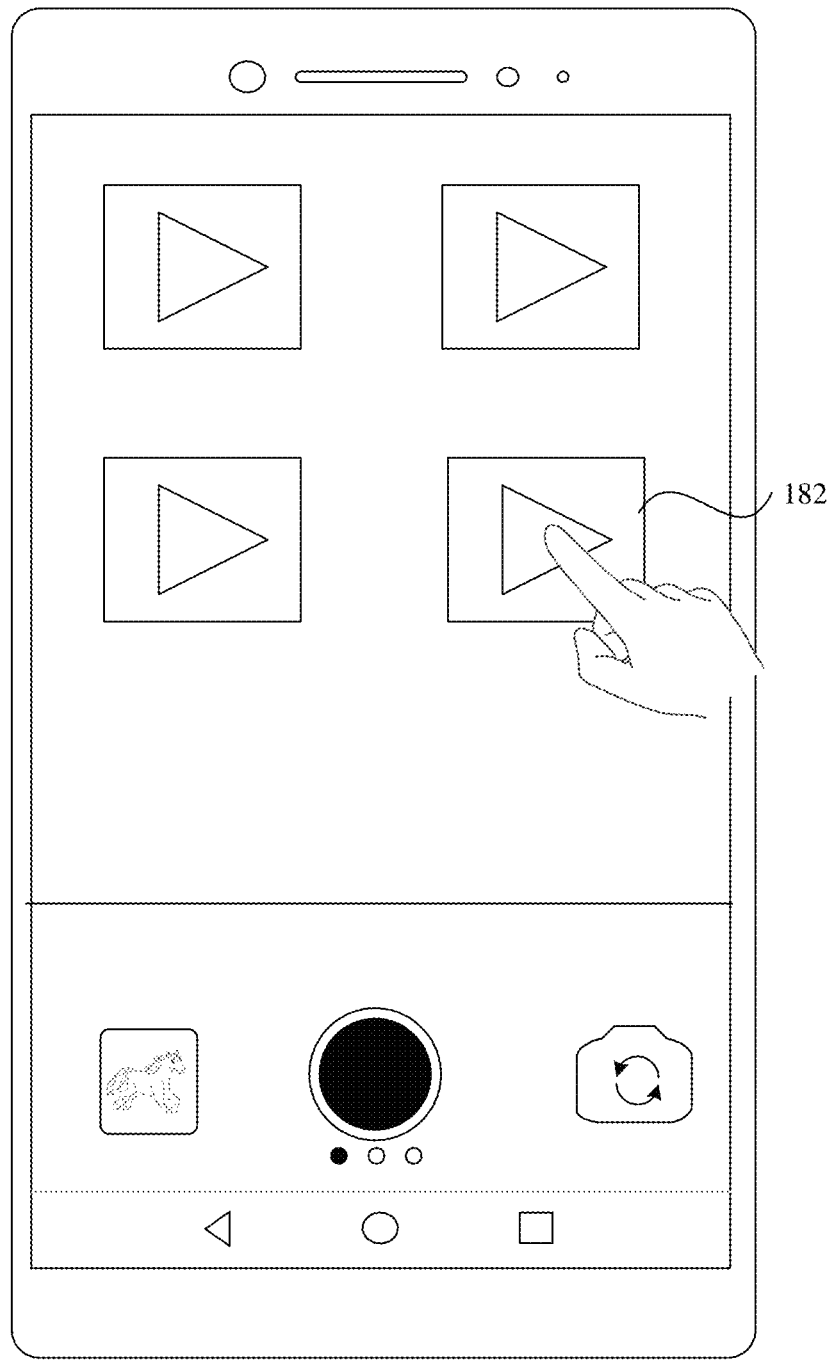
FIG. 18 is another schematic scenario diagram of obtaining an image according to an embodiment.

For example, as shown in FIG. 17, a user may shoot a video by using a camera interface 171 in the electronic device; or as shown in FIG. 18, the memory of the electronic device may store a plurality of videos, so that when the user needs to process a video, the user selects a video such as a video 182 from the plurality of videos stored in the memory. It may be understood that, the electronic device may alternatively select a video from a plurality of videos stored in a cloud for processing, download a video from a network for processing, or the like. This is not limited in this embodiment.

It may be understood that, in a process in which the user shoots the video, it is required that target objects in the video are consistent, and scenarios are consistent. In other words, the scenario and the target object should not be changed in the raw video. In addition, in the process in which the user shoots the video, whether hands of the user tremble is not limited in this embodiment. In other words, whether there is a jitter in the raw video is not limited in this embodiment.

1602. The electronic device selects, from the raw video, N video frames including the target object as N images.

The electronic device may detect, by using an object detection algorithm, an $x^{th}$ frame on which the target object starts to appear in the raw video, and a $y^{th}$ frame on which the target object ends in the raw video, where y is greater than x. Then the electronic device may select, by using a frame difference method or an equally spaced time interval method, N video frames from the $x^{th}$ frame to the $y^{th}$ frame as the N images. It may be understood that, for detailed description of the frame difference method or the equally spaced time interval method, refer to the foregoing embodiments.

1603. The electronic device obtains, based on the N images, a still image including N target objects, a still image including N−1 target objects, ..., a still image including one target object, and a background image including no target object.

It may be understood that, for a specific implementation of step 1603, refer to the specific implementations of the foregoing embodiments. Details are not described herein again.

1604. The electronic device synthesizes the raw video, the still image including N target objects, the still image including N−1 target objects, ..., the still image including one target object, and the background image including no target object into a target video.

It may be understood that, for a method for synthesizing the target video by the electronic device, refer to the description of the foregoing embodiments. Details are not described herein again.

1605. The electronic device displays the target video by using a display.

It may be understood that, the electronic device may further display the still images and the background image that are obtained in step 1603, and the like. This is not limited in this embodiment.

It may be understood that, the electronic device may further store one or more of the target video, the still images, and the background image into the memory, into the cloud, or the like. This is not limited in this embodiment.

1606. The electronic device shares the target video according to a sharing instruction input by the user.

For example, the electronic device may share the target video to a social reference by using the sharing instruction input by the user, share the target video to short video software, or the like. This is not limited in this embodiment.

In this embodiment, a dynamic video or an image with an effect of clones is synthesized, so that not only manual synthesis by a user is avoided, but also a display effect of the video or the image is improved. In addition, a novel and interesting video or image can be synthesized, thereby increasing user satisfaction with the electronic device.

The foregoing shows the method provided in the embodiments. The following describes in detail an apparatus in the embodiments.

Figure 19:
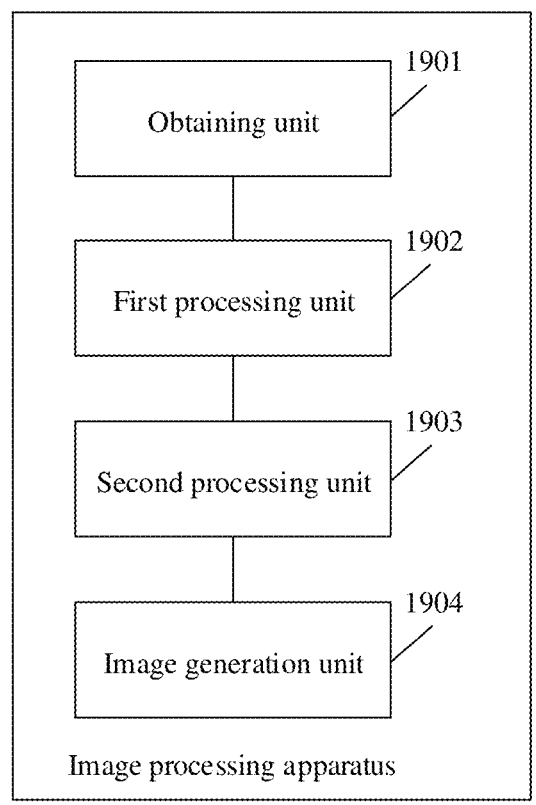
FIG. 19 is a schematic structural diagram of an image processing apparatus according to an embodiment.

FIG. 19 is a schematic structural diagram of an image processing apparatus according to an embodiment. The image processing apparatus may be configured to perform the method shown in FIG. 4, and the image processing apparatus may be further configured to perform the method shown in FIG. 9, and may be further configured to perform the method shown in FIG. 16. The image processing apparatus may be an electronic device, or a part, a chip, or the like that implements the foregoing functions in the electronic device. As shown in FIG. 19, the image processing apparatus includes:

an obtaining unit 1901, configured to obtain N images, where the N images have a same quantity of pixels and a same pixel location arrangement, and N is an integer greater than 1;

a first processing unit 1902, configured to obtain, based on feature values of pixels located at a same location in the N images, a reference value of the corresponding location;

a second processing unit 1903, configured to determine a target pixel of each location based on a reference value of the location; and an image generation unit 1904, configured to generate a target image based on the target pixel of each location.

In a possible implementation, the first processing unit 1902 is configured to: obtain feature values of pixels located at a location i in the N images to obtain a set i of feature values, where the location i is any same location in the N images; and obtain a reference value of the location i based on the set i of feature values.

In a possible implementation, the second processing unit 1903 is configured to select, from pixels located at a location j in the N images, a pixel whose feature value has a smallest difference from a reference value of the location j as a target pixel of the location j, where the location j is any same location in the N images.

In a possible implementation, the second processing unit 1903 is configured to select, from pixels located at a location j in the N images, a pixel whose feature value has a largest difference from a reference value of the location j as a target pixel of the location j, where the location j is any same location in the N images.

In a possible implementation, the first processing unit 1902 obtains the reference value of the location i based on the set i of feature values, and is configured to use an average value of the set i of feature values as the reference value of the location i.

In a possible implementation, the first processing unit 1902 obtains the reference value of the location i based on the set i of feature values, and is configured to use a median value of the set i of feature values as the reference value of the location i.

In a possible implementation, a feature value of any pixel includes a feature value of a local feature of the pixel.

In a possible implementation, a feature value of any pixel includes one or more of a grayscale value and a squared value.

In a possible implementation, a feature value of any pixel includes a sum of a feature value of a local feature of the pixel and a grayscale value of the pixel; or a feature value of any pixel includes a sum of a feature value of a local feature of the pixel and a squared value of the pixel.

In a possible implementation, the obtaining unit 1901 is configured to obtain N video frames in a raw video as the N images.

Figure 20:
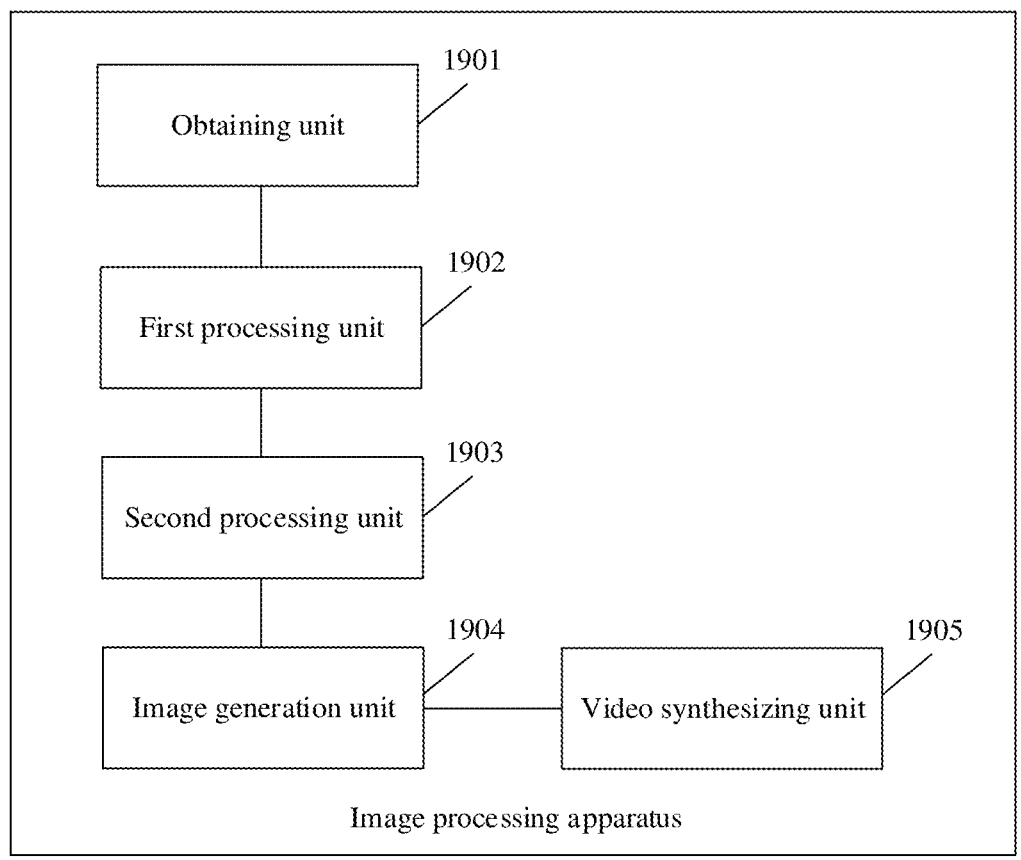
FIG. 20 is a schematic structural diagram of another image processing apparatus according to an embodiment.

In a possible implementation, as shown in FIG. 20, each of the N images includes a target object, and the image processing apparatus further includes:

a video synthesizing unit 1905, configured to synthesize a target video based on the target image and the N images, where the target video is a video in which the target objects constantly increase with a play order of the target video.

In a possible implementation, each of the N images includes a target object, and the image processing apparatus further includes:

a video synthesizing unit 1905, configured to synthesize a target video based on the target image and the N images, where the target video is a video in which the target objects constantly decrease with a play order of the target video.

In this embodiment, the processor shown in FIG. 1 may be further configured to perform the method shown by the obtaining unit 1901, the first processing unit 1902, the second processing unit 1903, and the image generation unit 1904. In addition, the processor 210 shown in FIG. 2 may also be configured to perform the method shown by the obtaining unit 1901, the first processing unit 1902, the second processing unit 1903, and the image generation unit 1904. Details are not described herein again.

It may be understood that, for an embodiment of the image processing apparatus, refer to the corresponding description of the foregoing method. Details are not described herein again.

An embodiment further provides a computer-readable storage medium. All or some of the procedures in the foregoing method embodiments may be completed by a computer program instructing related hardware. The program may be stored in the foregoing computer storage medium. When the program runs, the processes of the foregoing method embodiments may be included. The computer-readable storage medium may be an internal storage unit of the image processing apparatus in any one of the foregoing embodiments, for example, a hard disk or a memory of the image processing apparatus. The computer-readable storage medium may alternatively be an external storage device of the image processing apparatus, for example, a plug-connected hard disk, a smart media card (SMC), a secure digital (SD) card, or a flash card that are disposed on the image processing apparatus. Further, the computer-readable storage medium may include both the internal storage unit and the external storage device of the image processing apparatus. The computer-readable storage medium is configured to store the foregoing computer program and other programs and data required by the image processing apparatus. The computer-readable storage medium may be further configured to temporarily store data that has been output or is to be output.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments are generated. The computer may be a general-purpose computer, a dedicated computer, a computer network, or another programmable apparatus. The computer instructions may be stored in a computer-readable storage medium, or may be transmitted by using the computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

A sequence of the steps of the method in the embodiments may be adjusted, combined, or removed based on an actual requirement.

The modules in the apparatus in the embodiments may be combined, divided, and deleted based on an actual requirement.

In conclusion, the foregoing embodiments are merely intended for describing the solutions, but not for limiting this application. Although this application is described in detail with reference to the foregoing embodiments, persons of ordinary skill in the art should understand that they may still make modifications to the solutions described in the foregoing embodiments or make equivalent replacements to some features thereof, without departing from the scope of the solutions of the embodiments.

What is claimed is:

1. An image processing method, comprising:
    obtaining N images, wherein the N images have a same quantity of pixels and a same pixel location arrangement, each of the N images include images of a target object, N is an integer greater than 1, and the N images are obtained from N consecutive video frames in a raw video;
    obtaining, based on feature values of pixels located at a same location in the N images, a reference value of the corresponding location;
    determining a target pixel of each location, from pixels at the same location in each of the N images, based on the reference value of the location; and
    generating a target image based on the target pixel of each location, the target image comprising at least two images of the target object from the N images, at least one of the images of the target object in the target image being superposed, such that the target image displays the target object in two different locations or positions at two different times.

2. The method according to claim 1, wherein the obtaining, based on the feature values of the pixels located at the same location in the N images, the reference value of the corresponding location comprises:
    obtaining feature values of pixels located at a location i in the N images to obtain a set i of feature values, wherein the location i is any same location in the N images; and
    obtaining a reference value of the location i based on the set i of feature values.

3. The method according to claim 1, wherein the determining the target pixel of each location based on the reference value of the location comprises:
    selecting, from pixels located at a location j in the N images, a pixel whose feature value has a smallest difference from a reference value of the location j as a target pixel of the location j, wherein the location j is any same location in the N images.

4. The method according to claim 1, wherein the determining the target pixel of each location based on the reference value of the location comprises:
    selecting, from pixels located at a location j in the N images, a pixel whose feature value has a largest difference from a reference value of the location j as a target pixel of the location j, wherein the location j is any same location in the N images.

5. The method according to claim 2, wherein the obtaining the reference value of the location i based on the set i of feature values comprises:
    using an average value of the set i of feature values as the reference value of the location i.

6. The method according to claim 1, wherein after the generating the target image based on the target pixel of each location, the method further comprises:
    synthesizing a target video based on the target image and the N images, wherein the target video is a video in which the target objects increase in quantity with a play order of the target video.

7. The method according to claim 1, wherein after the generating the target image based on the target pixel of each location, the method further comprises:
    synthesizing a target video based on the target image and the N images, wherein the target video is a video in which the target objects decrease in quantity with a play order of the target video.

8. The method according to claim 1, wherein locations of the target object in the N images are different, and the target image comprises N target objects.

9. An image processing apparatus, comprising:
    a receiving interface;
    a memory storing executable instructions; and
    a processor configured to execute the executable instructions to:
    obtain N images, wherein the N images have a same quantity of pixels and a same pixel location arrangement, each of the N images include images of a target object, N is an integer greater than 1, and the N images are obtained from N consecutive video frames in a raw video;
    obtain, based on feature values of pixels located at a same location in the N images, a reference value of the corresponding location;
    determine a target pixel of each location, from pixels at the same location in each of the N images, based on the reference value of the location; and
    generate a target image based on the target pixel of each location, the target image comprising at least two images of the target object from the N images, at least one of the images of the target object in the target image being superposed, such that the target image displays the target object in two different locations or positions at two different times.

10. The apparatus according to claim 9, wherein
    the processor is further configured to: obtain feature values of pixels located at a location i in the N images to obtain a set i of feature values, wherein the location i is any same location in the N images; and obtain a reference value of the location i based on the set i of feature values.

11. The apparatus according to claim 9, wherein
    the processor is further configured to select, from pixels located at a location j in the N images, a pixel whose feature value has a smallest difference from a reference value of the location j as a target pixel of the location j, wherein the location j is any same location in the N images.

12. The apparatus according to claim 9, wherein
the processor is further configured to select, from pixels located at a location j in the N images, a pixel whose feature value has a largest difference from a reference value of the location j as a target pixel of the location j, wherein the location j is any same location in the N images.

13. The apparatus according to claim 10, wherein
the processor obtains the reference value of the location i based on the set i of feature values, and is further configured to use an average value of the set i of feature values as the reference value of the location i.

14. The apparatus according to claim 9, wherein the processor is further configured to:
synthesize a target video based on the target image and the N images, wherein the target video is a video in which the target objects increase in quantity with a play order of the target video.

15. The apparatus according to claim 9, wherein processor is further configured to:
synthesize a target video based on the target image and the N images, wherein the target video is a video in which the target objects decrease in quantity with a play order of the target video.

16. The apparatus according to claim 9, wherein locations of the target object in the N images are different, and the target image comprises N target objects.

17. A non-transitory computer storage medium, comprising computer instructions, wherein when the computer instructions are run on an electronic device, the electronic device is enabled to perform the following image processing method:
obtaining N images, wherein the N images have a same quantity of pixels and a same pixel location arrangement, each of the N images include images of a target object, N is an integer greater than 1, and the N images are obtained from N consecutive video frames in a raw video;
obtaining, based on feature values of pixels located at a same location in the N images, a reference value of the corresponding location;
determining a target pixel of each location, from pixels at the same location in each of the N images, based on the reference value of the location; and
generating a target image based on the target pixel of each location, the target image comprising at least two images of the target object from the N images, at least one of the images of the target object in the target image being superposed, such that the target image displays the target object in two different locations or positions at two different times.

* * * * *